(12) United States Patent
Tajima et al.

(10) Patent No.: US 9,160,474 B2
(45) Date of Patent: Oct. 13, 2015

(54) METHOD AND APPARATUS FOR DESIGNING NETWORK

(71) Applicant: FUJITSU LIMITED, Kawasaki-shi, Kanagawa (JP)

(72) Inventors: Kazuyuki Tajima, Yokosuka (JP); Tomohiro Hashiguchi, Inagi (JP); Yutaka Takita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 90 days.

(21) Appl. No.: 14/181,979

(22) Filed: Feb. 17, 2014

(65) Prior Publication Data

US 2014/0286640 A1    Sep. 25, 2014

(30) Foreign Application Priority Data

Mar. 21, 2013 (JP) ................................ 2013-058803

(51) Int. Cl.
*H04L 12/801* (2013.01)
*H04J 3/16* (2006.01)
*H04J 14/08* (2006.01)
*H04L 12/24* (2006.01)

(52) U.S. Cl.
CPC ............... *H04J 3/1682* (2013.01); *H04J 14/08* (2013.01); *H04L 41/145* (2013.01); *H04J 2203/0055* (2013.01); *H04J 2203/0069* (2013.01)

(58) Field of Classification Search
CPC . H04J 3/1682; H04J 14/08; H04J 2203/0069; H04J 2203/0055; H04L 41/145
USPC .................................................. 370/252, 254
See application file for complete search history.

(56) References Cited

U.S. PATENT DOCUMENTS

2009/0268636 A1*  10/2009  Zolfaghari et al. ........... 370/254
2012/0079116 A1    3/2012  Hashiguchi et al.

FOREIGN PATENT DOCUMENTS

JP          5-290023      11/1993
JP          2012-73705    4/2012

* cited by examiner

*Primary Examiner* — Kwang B Yao
*Assistant Examiner* — Syed M Bokhari
(74) *Attorney, Agent, or Firm* — Fujitsu Patent Center

(57) ABSTRACT

A network design method that determines a TDM transmission line for accommodating a given demand includes: extracting an available demand from among a plurality of provided demands; calculating a total bandwidth of the extracted available demand; sequentially selecting the plurality of demands; generating candidates for a combination of TDM transmission lines that accommodate the selected demand; and determining a combination of TDM transmission lines that accommodates the selected demand from among the candidates for the combination of TDM transmission lines. The generating process includes: extracting a TDM transmission line with a band utilization efficiency higher than a specified threshold from among TDM transmission lines including the selected demand as an available demand; and generating candidates for a combination of TDM transmission lines that accommodate the selected demand using the extracted TDM transmission line.

13 Claims, 39 Drawing Sheets

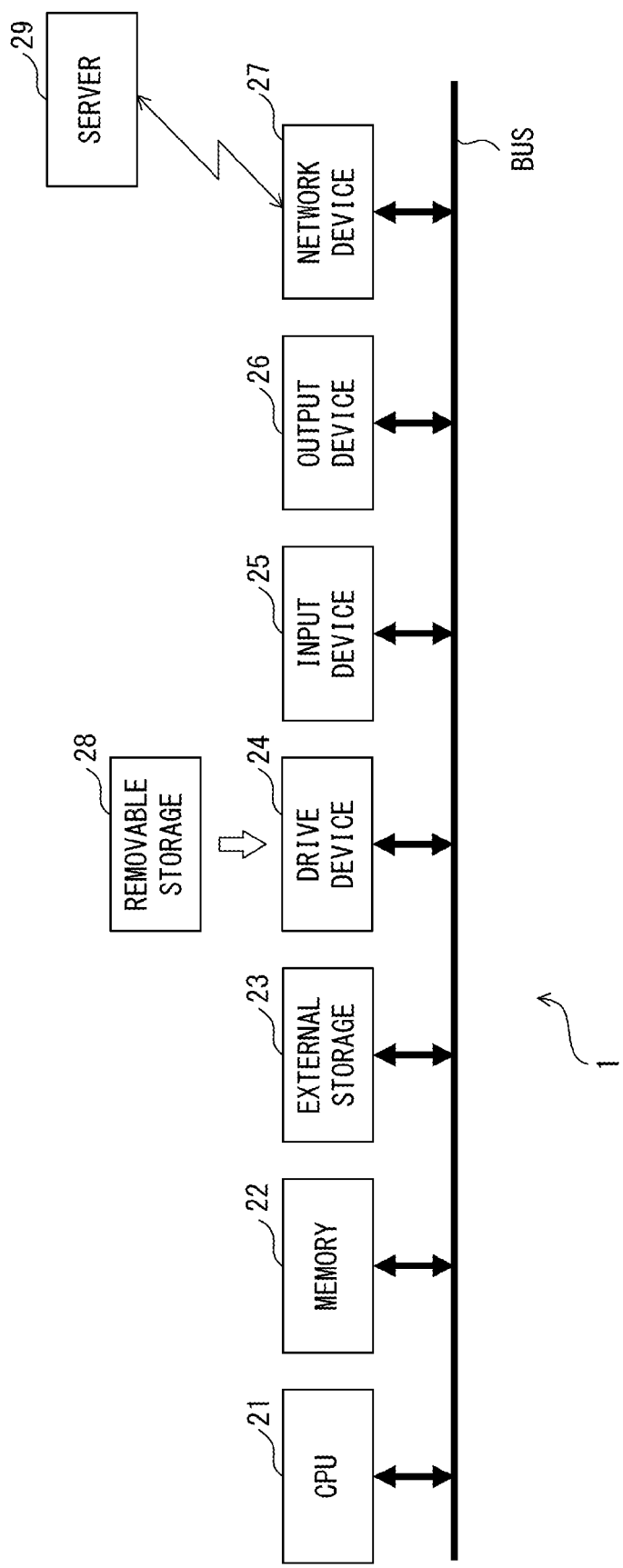
F I G. 4

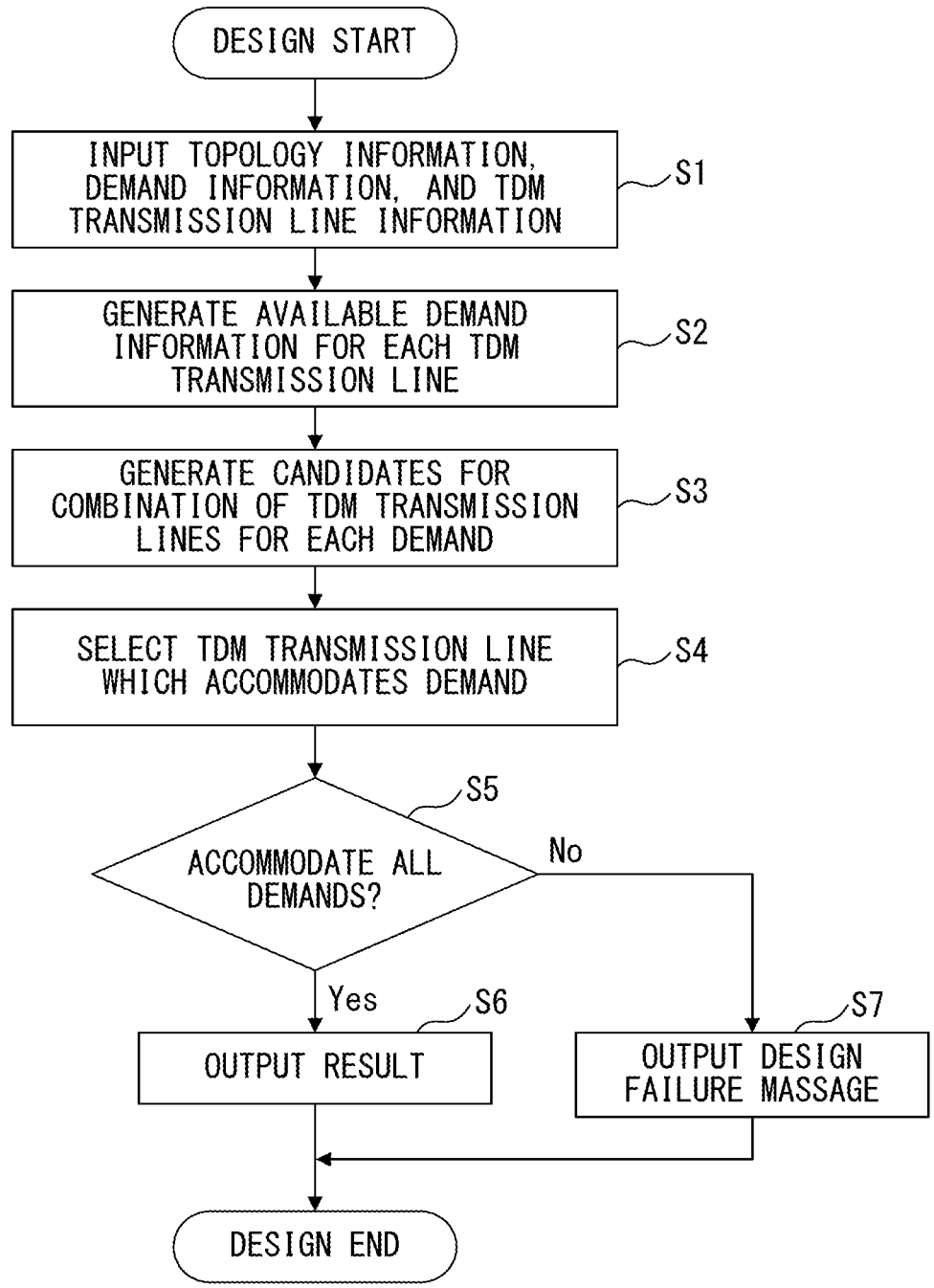
F I G. 5

| NODE NAME |
|---|
| N1 |
| N2 |
| N3 |
| N4 |
| N5 |

F I G. 7 A

| START POINT NODE | END POINT NODE |
|---|---|
| N1 | N2 |
| N2 | N3 |
| N3 | N4 |
| N4 | N5 |

F I G. 7 B

| DEMAND | | | | | | |
|---|---|---|---|---|---|---|
| START POINT NODE | END POINT NODE | BANDWIDTH | NUMBER OF LINES | BANDWIDTH | NUMBER OF LINES | TOTAL BANDWIDTH | ROUTE |
| N1 | N2 | 1 | 6 | 2 | 0 | 6 | N1, N2 |
| N2 | N3 | 1 | 2 | 2 | 1 | 4 | N2, N3 |
| N3 | N4 | 1 | 4 | 2 | 0 | 4 | N3, N4 |
| N4 | N5 | 1 | 0 | 2 | 3 | 6 | N4, N5 |
| N1 | N3 | 1 | 4 | 2 | 1 | 6 | N1, N2, N3 |
| N2 | N4 | 1 | 2 | 2 | 0 | 2 | N2, N3, N4 |
| N3 | N5 | 1 | 7 | 2 | 0 | 7 | N3, N4, N5 |
| N1 | N4 | 1 | 1 | 2 | 0 | 1 | N1, N2, N3, N4 |
| N2 | N5 | 1 | 4 | 2 | 2 | 8 | N2, N3, N4, N5 |
| N1 | N5 | 1 | 1 | 2 | 0 | 1 | N1, N2, N3, N4, N5 |

FIG. 9

TDM TRANSMISSION LINE

| START POINT NODE | END POINT NODE | CAPACITY | ROUTE |
|---|---|---|---|
| N1 | N2 | 8 | N1, N2 |
| N2 | N3 | 8 | N2, N3 |
| N3 | N4 | 8 | N3, N4 |
| N4 | N5 | 8 | N4, N5 |
| N1 | N3 | 8 | N1, N2, N3 |
| N2 | N4 | 8 | N2, N3, N4 |
| N3 | N5 | 8 | N3, N4, N5 |
| N1 | N4 | 8 | N1, N2, N3, N4 |
| N2 | N5 | 8 | N2, N3, N4, N5 |
| N1 | N5 | 8 | N1, N2, N3, N4, N5 |

| TDM TRANSMISSION LINE | | TOTAL BANDWIDTH | AVAILABLE DEMAND LIST |
|---|---|---|---|
| START POINT | END POINT | | |
| N1 | N2 | 14 | N1→N2, N1→N3, N1→N4, N1→N5 |
| N2 | N3 | 22 | N2→N3, N1→N3, N2→N4, N1→N4, N2→N5, N1→N5 |
| N3 | N4 | 23 | N3→N4, N2→N4, N3→N5, N1→N4, N2→N5, N1→N5 |
| N4 | N5 | 22 | N4→N5, N3→N5, N2→N5, N1→N5 |
| N1 | N3 | 8 | N1→N3, N1→N4, N1→N5 |
| N2 | N4 | 12 | N2→N4, N1→N4, N2→N5, N1→N5 |
| N3 | N5 | 16 | N3→N5, N2→N5, N1→N5 |
| N1 | N4 | 2 | N1→N4, N1→N5 |
| N2 | N5 | 9 | N2→N5, N1→N5 |
| N1 | N5 | 1 | N1→N5 |

| N1 | | N2 | | N3 | | N4 | | N5 |

FIG. 15

TDM TRANSMISSION LINE

| START POINT | END POINT | TOTAL BANDWIDTH | BWmod |
|---|---|---|---|
| N1 | N2 | 14 | 6 |
| N2 | N3 | 22 | 6 |
| N3 | N4 | 23 | 7 |
| N4 | N5 | 22 | 6 |
| N1 | N3 | 8 | 0 |
| N2 | N4 | 12 | 4 | ←
| N3 | N5 | 16 | 0 |
| N1 | N4 | 2 | 2 | ←
| N2 | N5 | 9 | 1 | ←
| N1 | N5 | 1 | 1 | ←

FIG. 16

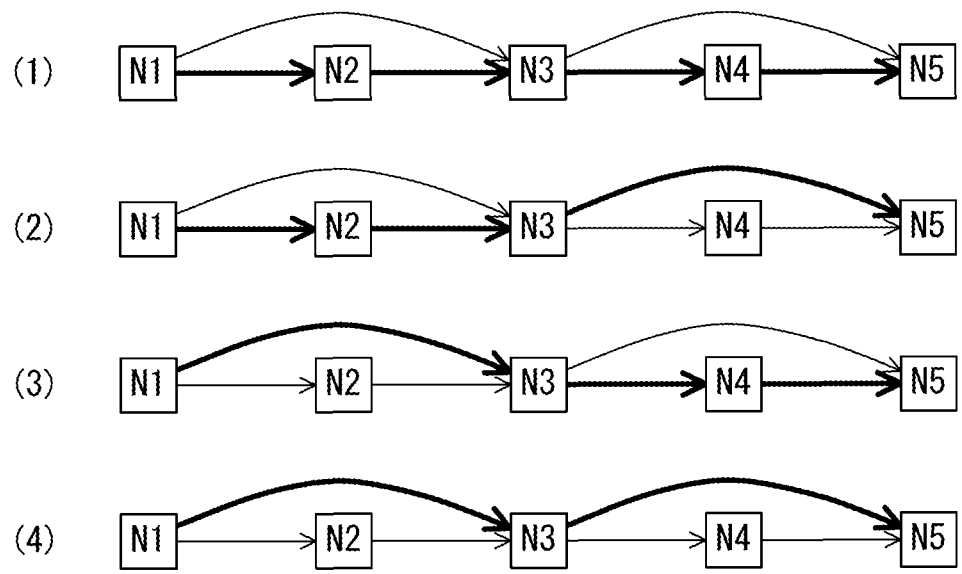
F I G. 1 8

| TDM TRANSMISSION LINE | | TOTAL BANDWIDTH | AVAILABLE DEMAND LIST |
|---|---|---|---|
| START POINT | END POINT | | |
| N1 | N2 | 14 | N1→N2, N1→N3, N1→N4, N1→N5 |
| N2 | N3 | 22 | N2→N3, N1→N3, N2→N4, N1→N4, N2→N5, N1→N5 |
| N3 | N4 | 23 | N3→N4, N2→N4, N3→N5, N1→N4, N2→N5, N1→N5 |
| N4 | N5 | 22 | N4→N5, N3→N5, N2→N5, N1→N5 |
| N1 | N3 | 8 | N1→N3, N1→N4, N1→N5 |
| N2 | N4 | 12→11 | N2→N4, N1→N4, N2→N5 |
| N3 | N5 | 16 | N3→N5, N2→N5, N1→N5 |
| N1 | N4 | 2→1 | N1→N4 |
| N2 | N5 | 9→8 | N2→N5 |
| N1 | N5 | 1→0 | |

F I G. 1 9

TDM TRANSMISSION LINE
| START POINT | END POINT | TOTAL BANDWIDTH | BWmod |
|---|---|---|---|
| N1 | N2 | 14 | 6 |
| N2 | N3 | 22 | 6 |
| N3 | N4 | 23 | 7 |
| N1 | N3 | 8 | 0 |
| N2 | N4 | 11 | 3 | ←
| N1 | N4 | 1 | 1 | ←
F I G. 2 0 A
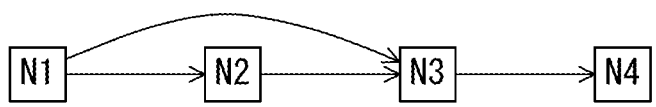
F I G. 2 0 B
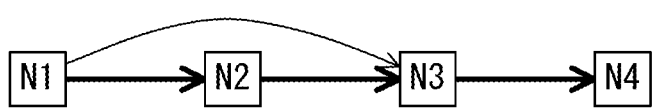
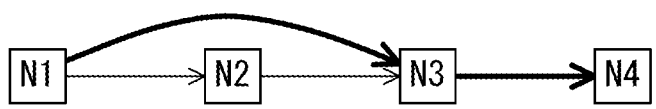
F I G. 2 0 C

| TDM TRANSMISSION LINE | | TOTAL BANDWIDTH | AVAILABLE DEMAND LIST |
|---|---|---|---|
| START POINT | END POINT | | |
| N1 | N2 | 14 | N1→N2, N1→N3, N1→N4, N1→N5 |
| N2 | N3 | 22 | N2→N3, N1→N3, N2→N4, N1→N4, N2→N5, N1→N5 |
| N3 | N4 | 23 | N3→N4, N2→N4, N3→N5, N1→N4, N2→N5, N1→N5 |
| N4 | N5 | 22 | N4→N5, N3→N5, N2→N5, N1→N5 |
| N1 | N3 | 8 | N1→N3, N1→N4, N1→N5 |
| N2 | N4 | 11→10 | N2→N4, N2→N5 |
| N3 | N5 | 16 | N3→N5, N2→N5, N1→N5 |
| N1 | N4 | 1→0 | |
| N2 | N5 | 8 | N2→N5 |
| N1 | N5 | 0 | |

FIG. 21

| TDM TRANSMISSION LINE | | | |
|---|---|---|---|
| START POINT | END POINT | TOTAL BANDWIDTH | BWmod |
| N2 | N3 | 22 | 6 |
| N3 | N4 | 23 | 7 |
| N4 | N5 | 22 | 6 |
| N2 | N4 | 12 | 4 |
| N3 | N5 | 16 | 0 |
| N2 | N5 | 8 | 0 |
F I G.  2 2 A
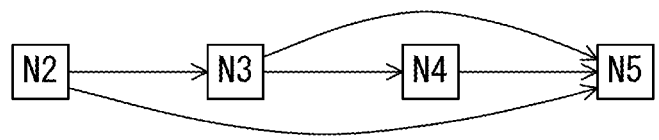
F I G.  2 2 B
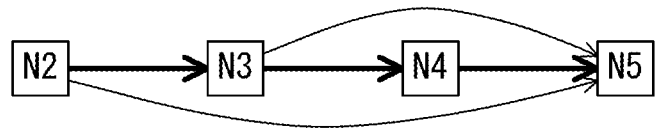
F I G.  2 2 C

FIG. 23

| TDM TRANSMISSION LINE | | TOTAL BANDWIDTH | AVAILABLE DEMAND LIST |
|---|---|---|---|
| START POINT | END POINT | | |
| N1 | N2 | 14 | N1→N2, N1→N3, N1→N4, N1→N5 |
| N2 | N3 | 22 | N2→N3, N1→N3, N2→N4, N1→N4, N2→N5, N1→N5 |
| N3 | N4 | 23 | N3→N4, N2→N4, N3→N5, N1→N4, N2→N5, N1→N5 |
| N4 | N5 | 22 | N4→N5, N3→N5, N2→N5, N1→N5 |
| N1 | N3 | 8 | N1→N3, N1→N4, N1→N5 |
| N2 | N4 | 10→2 | N2→N4 |
| N3 | N5 | 16 | N3→N5, N2→N5, N1→N5 |
| N1 | N4 | 0 | |
| N2 | N5 | 8 | N2→N5 |
| N1 | N5 | 0 | |

TDM TRANSMISSION LINE
| START POINT | END POINT | TOTAL BANDWIDTH | BWmod |
|---|---|---|---|
| N1 | N2 | 14 | 6 |
| N2 | N3 | 22 | 6 |
| N1 | N3 | 8 | 0 |
FIG. 24A
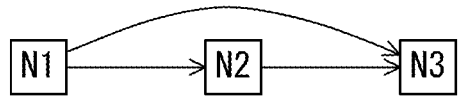
FIG. 24B
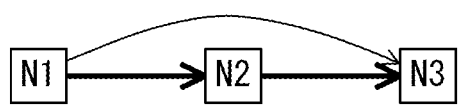
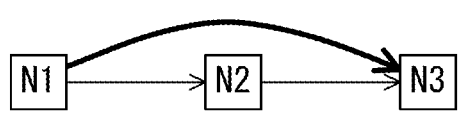
FIG. 24C TDM TRANSMISSION LINE
| START POINT | END POINT | TOTAL BANDWIDTH | BWmod |
|---|---|---|---|
| N2 | N3 | 22 | 6 |
| N3 | N4 | 23 | 7 |
| N2 | N4 | 2 | 2 | ←
F I G.  2 5 A
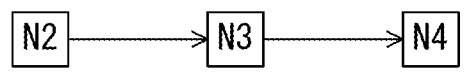
F I G.  2 5 B
F I G.  2 5 C

| TDM TRANSMISSION LINE | | TOTAL BANDWIDTH | AVAILABLE DEMAND LIST |
|---|---|---|---|
| START POINT | END POINT | | |
| N1 | N2 | 14 | N1→N2, N1→N3, N1→N4, N1→N5 |
| N2 | N3 | 22 | N2→N3, N1→N3, N2→N4, N1→N4, N2→N5, N1→N5 |
| N3 | N4 | 23 | N3→N4, N2→N4, N3→N5, N1→N4, N2→N5, N1→N5 |
| N4 | N5 | 22 | N4→N5, N3→N5, N2→N5, N1→N5 |
| N1 | N3 | 8 | N1→N3, N1→N4, N1→N5 |
| N2 | N4 | 2→0 | |
| N3 | N5 | 16 | N3→N5, N2→N5, N1→N5 |
| N1 | N4 | 0 | |
| N2 | N5 | 8 | N2→N5 |
| N1 | N5 | 0 | |

TDM TRANSMISSION LINE
| START POINT | END POINT | TOTAL BANDWIDTH | BWmod |
|---|---|---|---|
| N3 | N4 | 23 | 7 |
| N4 | N5 | 22 | 6 |
| N3 | N5 | 16 | 0 |
F I G. 2 7 A
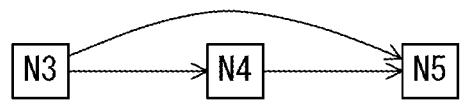
F I G. 2 7 B
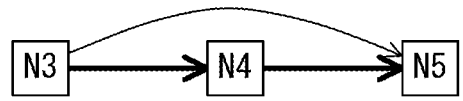
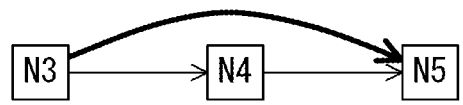
F I G. 2 7 C

| START POINT NODE | END POINT NODE | DISTANCE |
|---|---|---|
| N1 | N2 | 11.2km |
| N2 | N3 | 21.1km |
| N3 | N4 | 18.5km |
| N4 | N5 | 13.0km |

FIG. 28

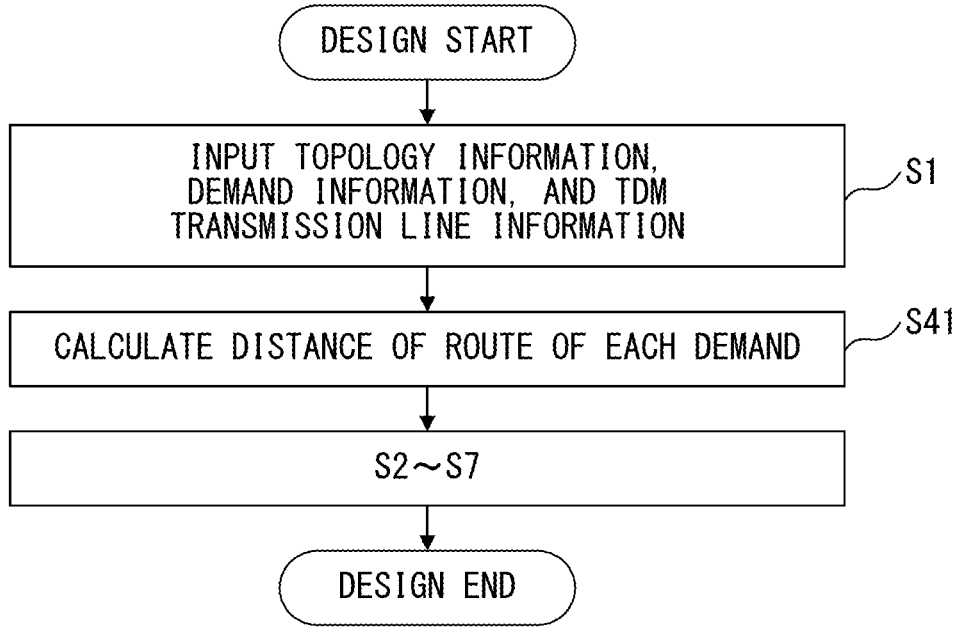
F I G. 2 9 A
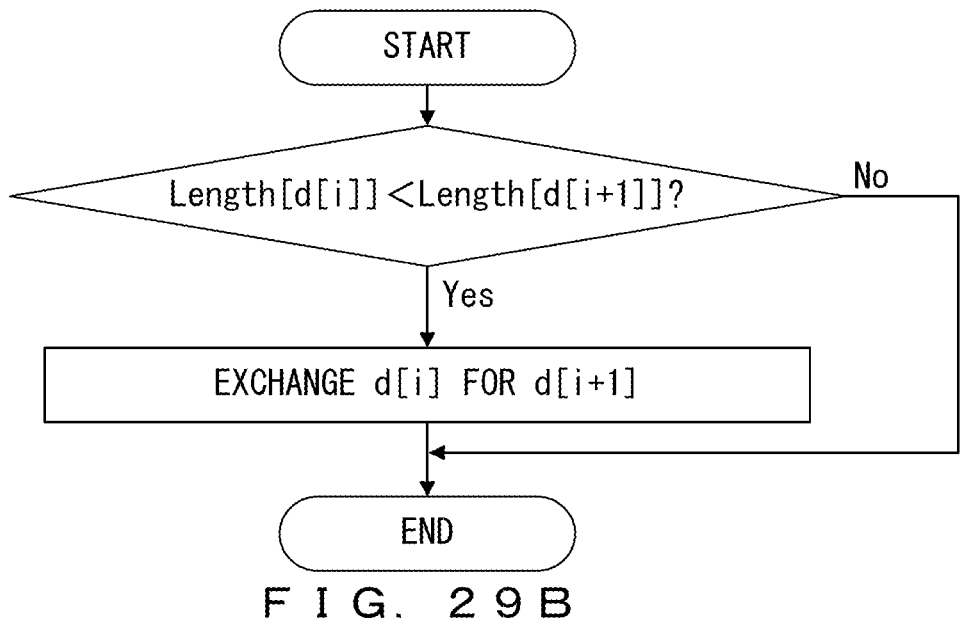
F I G. 2 9 B

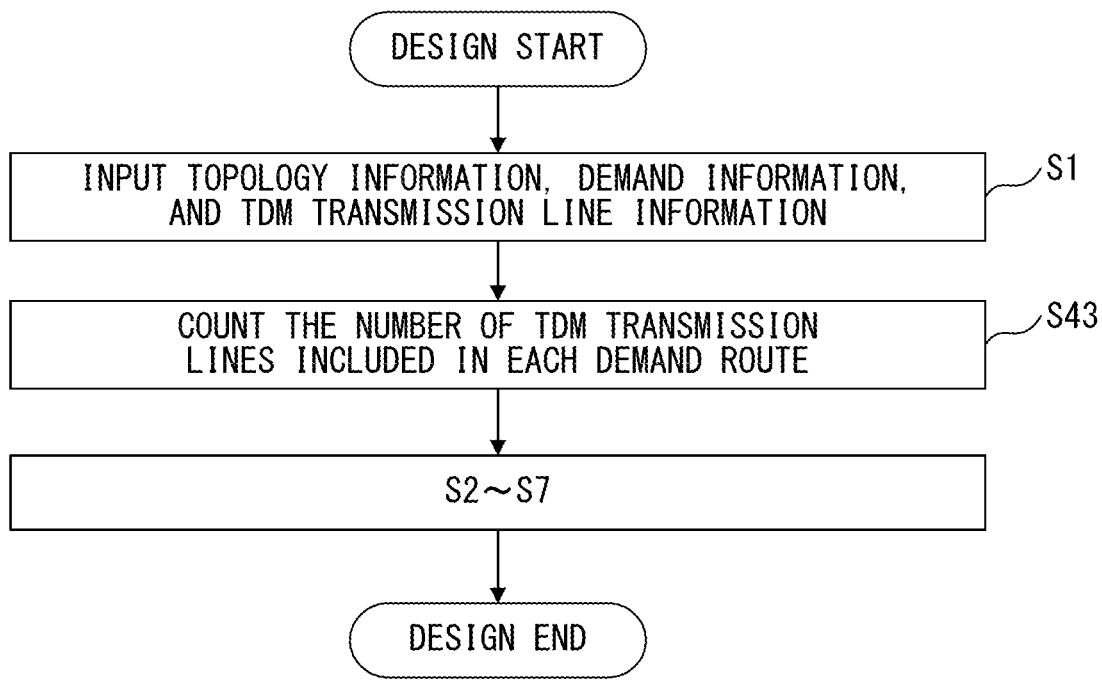
F I G. 3 2 A
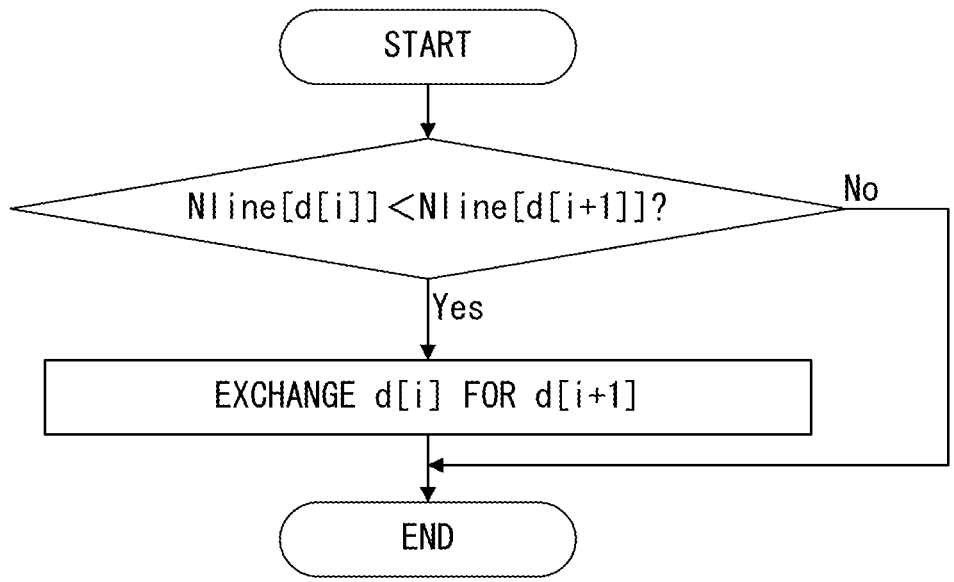
F I G. 3 2 B

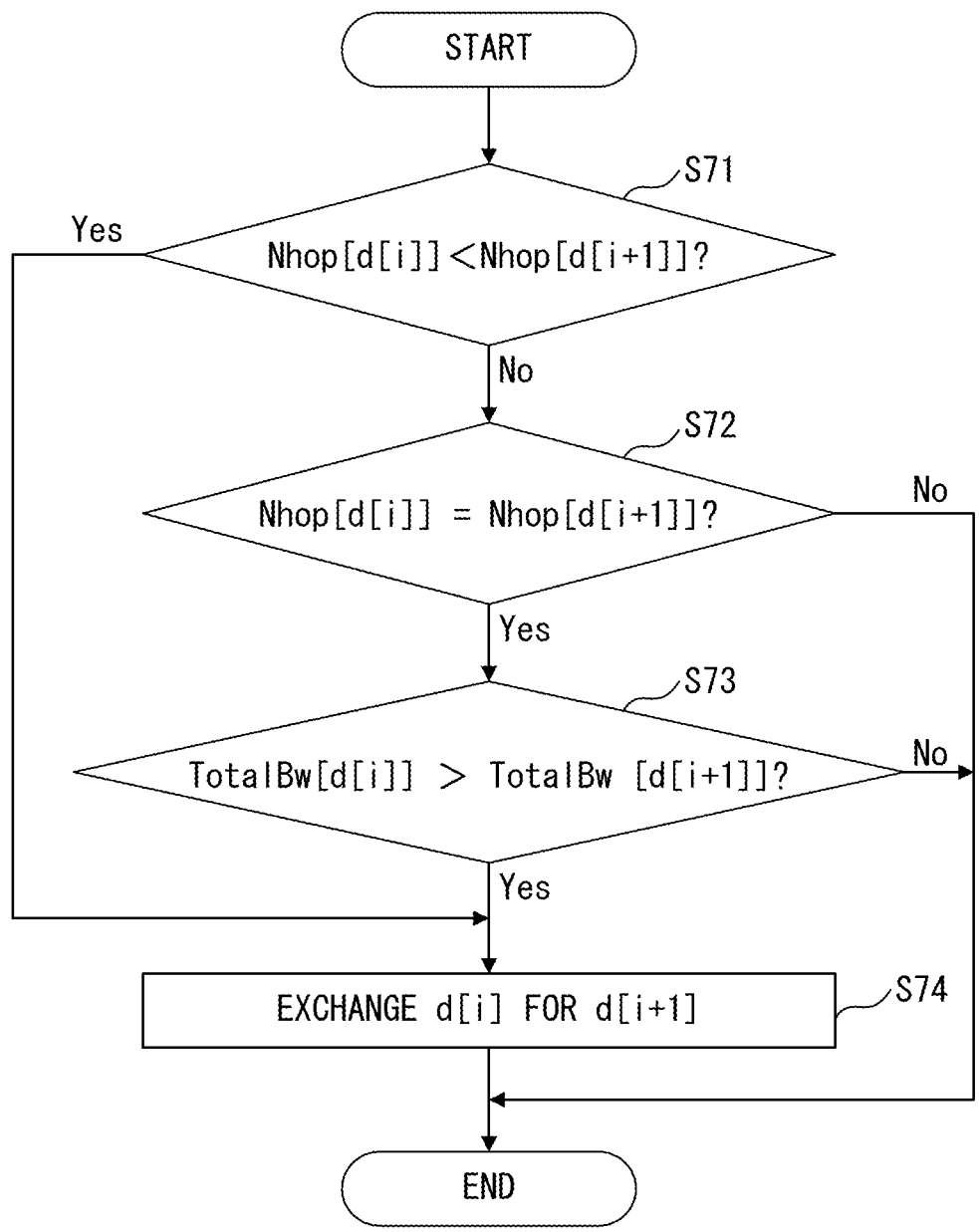
F I G. 34

| START POINT NODE | END POINT NODE |
|---|---|
| N1 | N2 |
| N2 | N3 |
| N3 | N4 |
| N4 | N5 |
| N1 | N3 |
| N2 | N4 |
| N3 | N5 |
| N1 | N4 |
| N2 | N5 |
| N1 | N5 |

F I G. 3 7

METHOD AND APPARATUS FOR DESIGNING NETWORK

CROSS-REFERENCE TO RELATED APPLICATION

This application is based upon and claims the benefit of priority of the prior Japanese Patent Application No. 2013-058803, filed on Mar. 21, 2013, the entire contents of which are incorporated herein by reference.

FIELD

The embodiments discussed herein are related to a method and an apparatus for designing a network.

BACKGROUND

When a plurality of signals of subscriber lines are transmitted through the same optical fiber, the plurality of signals of subscriber lines are accommodated with, for example, Time Division Multiplexing (TDM). A signal of a subscriber line accommodated in a TDM transmission line is often referred to as a "traffic demand" or simply as a "demand", and therefore the subscriber line accommodated in the TDM transmission line is hereinafter referred to as a "demand".

For the TDM transmission line, the SDH (Synchronous Digital Hierarchy) and the OTN (Optical Transport Network), etc., are put into practical use, for example. Commonly, one TDM transmission line such as an SDH transmission line is set in one optical fiber, before Wavelength Division Multiplexing (WDM) is introduced. Therefore, before the WDM is introduced, an optical fiber is respectively laid between nodes (e.g., telephone exchanges), and a TDM transmission line is set between the nodes.

Assume, for example, that, in a transmission system including nodes A-E as illustrated in FIG. 1A, an optical fiber is respectively laid between A and B, B and C, C and D, and D and E. Further, assume that one TDM transmission line is set in one optical fiber. Namely, TDM transmission lines #1, #2, #3, and #4 are respectively set between A and B, B and C, C and D, and D and E. In this case, when a demand which transmits a signal between the node A and the node E is provided, this demand is accommodated in the TDM transmission lines #1, #2, #3, and #4. Namely, there is one method for accommodating this command (or, one accommodation pattern). Hereinafter, a demand which transmits a signal between a node i and a node j is sometimes referred to as a "demand i-j".

In recent years, WDM technology has been widely spread, and an Optical Add/Drop Multiplexer (OADM) is often provided in each node. As illustrated in FIG. 2, the OADM can branch an optical signal of a desired wavelength from a received WDM optical signal and guide it to a subscriber. In addition, the OADM can add a subscriber signal into a WDM optical signal. Further, the OADM can transmit an optical signal included in the received WDM signal to the next node without converting it into an electrical signal.

Here, assume that an OADM is provided in each of the nodes B, C, and D in the transmission system illustrated in FIG. 1A. Then, the transmission system can provide TDM transmission lines #5-#10 illustrated in FIG. 1B, in addition to the TDM transmission lines #1-#4 illustrated in FIG. 1A. In this case, demands A-E may be accommodated with a desired pattern from among seven patterns illustrated in FIG. 1C in addition to the accommodation pattern illustrated in FIG. 1A. Namely, the demands A-E may be accommodated in, for example, the TDM transmission lines #5, #3, and #4 or the TDM transmission lines #1, #2, and #6. As described above, by using the WDM technology, the flexibility in a design of TDM transmission lines which will accommodate a demand increases.

In, for example, Japanese Laid-Open Patent Application Publication No. 5-290023 and Japanese Laid-Open Patent Application Publication No. 2012-73705, a technology relating to a network design is described.

In a transmission system in which a plurality of signals are transmitted with TDM, which demand is accommodated in which TDM transmission line is determined in advance. At this time, each demand is preferably accommodated in a TDM transmission line in order to efficiently utilize a communication resource (e.g., a bandwidth).

However, as described above, in the transmission system using the WDM technology, the number of patterns of a combination of TDM transmission lines which will accommodate a demand is large. For that reason, in a large-scale transmission system, in which there are many nodes, it takes a huge amount of time to determine an efficient accommodation pattern. In addition, when the efficient accommodation pattern is determined using a computer, a huge storage capacity is needed for executing the calculation.

SUMMARY

According to an aspect of the embodiments, a network design method determines a TDM transmission line for accommodating a given demand, that is represented by a start point, an end point, a bandwidth, and a route, in a network including a plurality of TDM transmission lines. The method includes: extracting, for respective TDM transmission lines, an available demand that is capable of using the TDM transmission line from among a plurality of provided demands; calculating a total bandwidth of the extracted available demand for respective TDM transmission lines; sequentially selecting the plurality of demands; generating candidates for a combination of TDM transmission lines that accommodate the selected demand; and determining a combination of TDM transmission lines that accommodates the selected demand from among the candidates for the combination of TDM transmission lines. The process of generating the candidates for the selected demand includes: extracting a TDM transmission line with a band utilization efficiency higher than a specified threshold from among TDM transmission lines including the selected demand as an available demand, based on the total bandwidth of the available demand for respective TDM transmission lines; generating candidates for a combination of TDM transmission lines that accommodate the selected demand using the extracted TDM transmission line, based on the start point, the end point, and the route of the selected demand; and updating the total bandwidth of the available demand of the TDM transmission line with a band utilization efficiency that does not exceed the threshold using a bandwidth of the selected demand, for a demand that is to be selected next.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a hardware configuration of the network design apparatus.

FIG. 5 is a flowchart which illustrates a network design method according to an embodiment.

FIGS. 7A and 7B illustrate an example of topology information.

FIG. 9 illustrates an example of demand information.

FIG. 10 illustrates an example of TDM transmission line information.

FIG. 11 illustrates an example of available demand information.

FIG. 15 illustrates the initial state of a route search graph.

FIG. 16 illustrates extracted TDM transmission lines and corresponding BWmod values.

FIG. 18 illustrates route search results.

FIG. 19 illustrates updated available demand information.

FIGS. 20A-20C illustrate a process of generating candidates for a demand N1-N4.

FIG. 21 illustrates updated available demand information in the process for the demand N1-N4.

FIGS. 22A-22C illustrate a process of generating candidates for a demand N2-N5.

FIG. 23 illustrates updated available demand information in the process for the demand N2-N5.

FIGS. 24A-24C illustrate a process of generating candidates for a demand N1-N3.

FIGS. 25A-25C illustrate a process of generating candidates for a demand N2-N4.

FIGS. 27A-27C illustrate a process of generating candidates for a demand N3-N5.

FIG. 28 illustrates an example of a link list of topology information used in a second embodiment.

FIGS. 29A and 29B are flowcharts which illustrate a process according to the second embodiment.

FIGS. 32A and 32B are flowcharts which illustrate a process according to a forth embodiment.

FIG. 34 is a flowchart which illustrates a demand rearrangement process according to a fifth embodiment.

FIG. 37 illustrates an example of an available TDM transmission line list.

DESCRIPTION OF EMBODIMENTS

In a network design method according to embodiments of the present invention, a TDM transmission line which will accommodate a demand represented by a start point, an endpoint, a bandwidth, and a route is determined in a network including a plurality of TDM transmission lines. Namely, which demand is accommodated in which TDM transmission line is determined. Alternatively, one or more TDM transmission lines which will accommodate each demand are selected. At this time, in the network design method according to the embodiments, the given demand is accommodated in one or more TDM transmission lines in order to efficiently utilize a communication resource (e.g., a bandwidth).

Figure 1A:
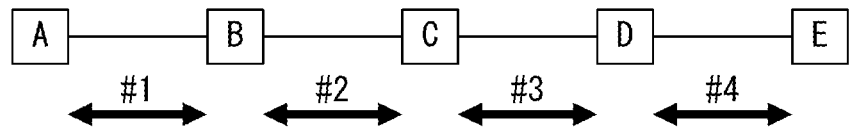
FIGS. 1A-1C illustrate TDM transmission lines and a combination of the TDM transmission lines which will accommodate a demand.
Figure 1B:
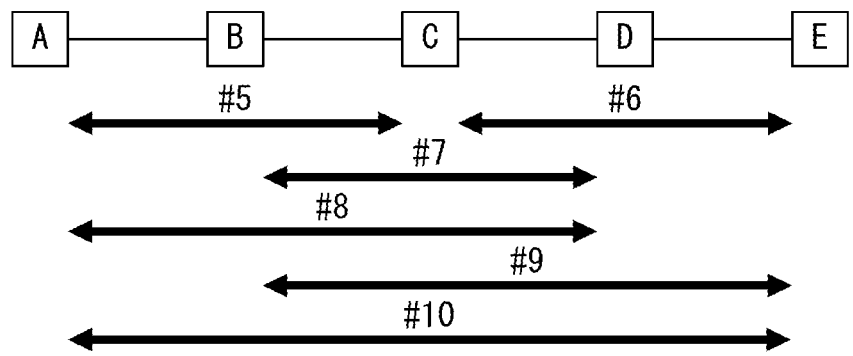
Figure 1C:
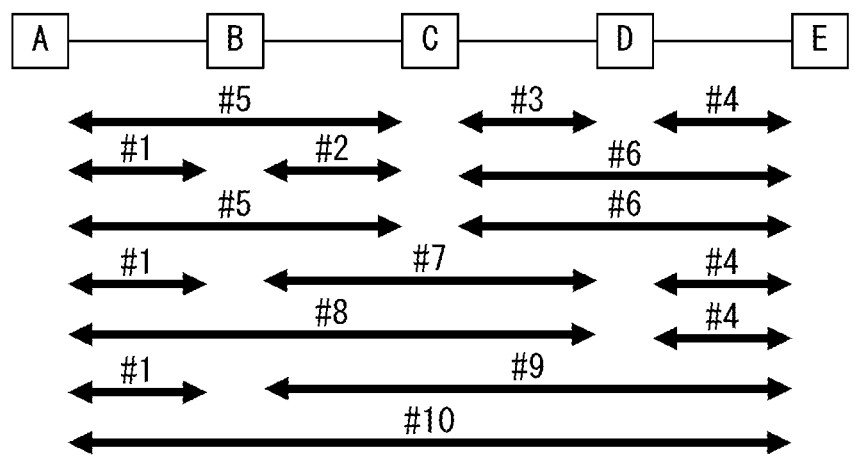
Figure 2:
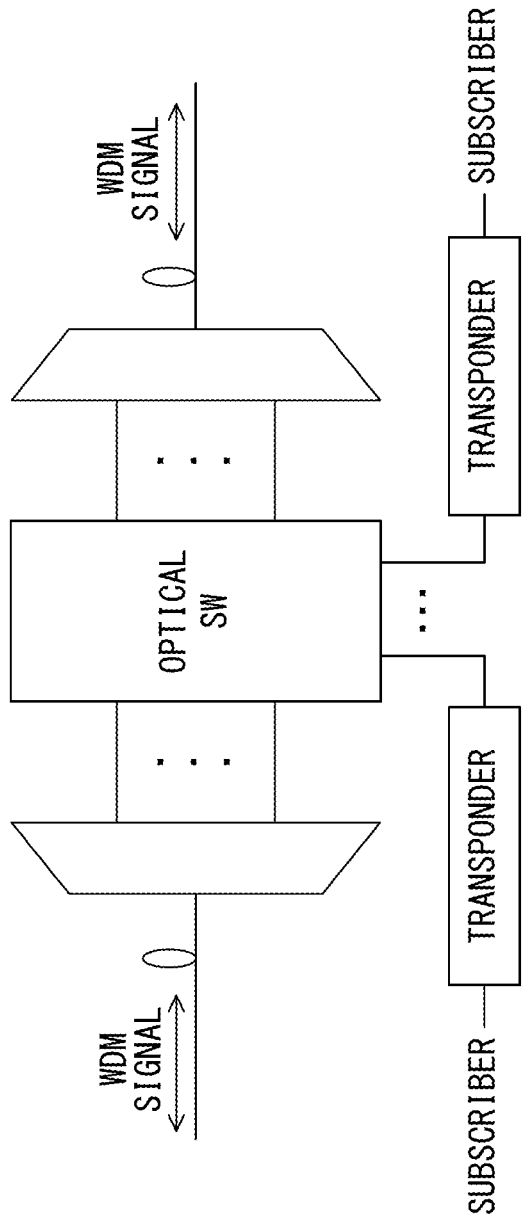
FIG. 2 illustrates an example of an OADM.
Figure 3:
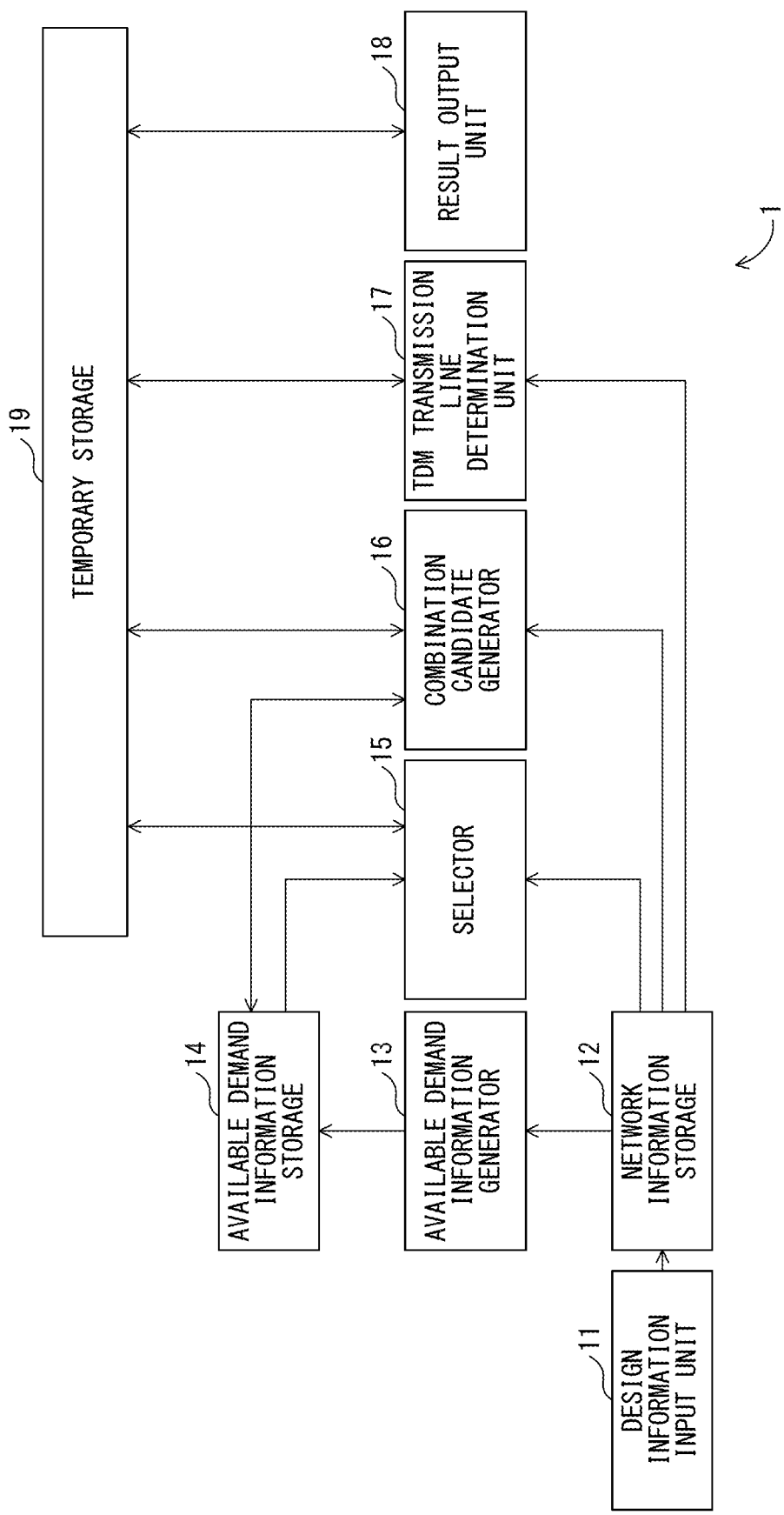
FIG. 3 is a block diagram which illustrates a function of a network design apparatus.

FIG. 3 illustrates a function of a network design apparatus according to the embodiments of the present invention. As illustrated in FIG. 3, the network design apparatus 1 according to the embodiments includes a design information input unit 11, a network information storage 12, an available demand information generator 13, an available demand information storage 14, a selector 15, a combination candidate generator 16, a TDM transmission line determination unit 17, a result output unit 18, and a temporary storage 19.

The design information input unit 11 obtains design information and stores the design information in the network information storage 12. The design information is input by, for example, a user or a network administrator. The design information includes topology information, demand information, and TDM transmission line information.

The available demand information generator 13 uses the design information stored in the network information storage 12 and generates available demand information. The generated available demand information is stored in the available demand information storage 14.

The selector 15 selects a plurality of demands provided as the design information one at a time in order. Then, the selector 15 selects one or more TDM transmission lines to be used for accommodating each of the selected demands. Information which specifies the demands and the TDM transmission lines selected by the selector 15 is stored in the temporary storage 19.

The combination candidate generator 16 refers to the temporary storage 19 and generates candidates for a combination of the TDM transmission lines which will accommodate each of the demands selected by the selector 15. Information indicating the generated candidates is written in the temporary storage 19.

The TDM transmission line determination unit 17 refers to the temporary storage 19 and obtains the information indicating the candidates generated by the combination candidate generator 16. Then, the TDM transmission line determination unit 17 determines a combination of the TDM transmission lines which will accommodate the demand selected by the selector 15. A design result generated by the TDM transmission line determination unit 17 (i.e., a combination of TDM transmission lines which will accommodate each of the demands) is written in the temporary storage 19. The result output unit 18 reads the design result from the temporary storage 19 and outputs the design result.

The design information input unit 11, the available demand information generator 13, the selector 15, the combination candidate generator 16, the TDM transmission line determination unit 17, and the result output unit 18 respectively correspond to, for example, classes in an object-oriented language. In addition, the design information input unit 11, the available demand information generator 13, the selector 15, the combination candidate generator 16, the TDM transmission line determination unit 17, and the result output unit 18 are provided by executing a network design program according to the embodiments of the present invention.

FIG. 4 illustrates an example of a hardware configuration of the network design apparatus according to the embodiments of the present invention. The network design apparatus 1 is realized by using a computer system illustrated in FIG. 4. As illustrated in FIG. 4, the computer system which realizes the network design apparatus 1 includes a CPU 21, a memory 22, an external storage 23, a drive device 24, an input device 25, an output device 26, and a network device 27.

The CPU 21 provides the function illustrated in FIG. 3 by executing the network design program. Note that the CPU 21 may execute other programs. The memory 22 is used as a work area of the CPU 21. The external storage 23 is a large-capacity storage such as a hard disk. The drive device 24 reads information written in a removable storage 28 according to instructions of the CPU 21. The removable storage 28 is realized by, for example, a semiconductor memory, an optical information readable/writable storage, or a magnetic information readable/writable storage.

The input device 25 is, for example, a keyboard, a mouse, or a touch panel, and it accepts a user input. The output device 26 is, for example, a display apparatus, and it outputs a processing result according to instructions from the CPU 21. The network device 27 provides an interface for connecting to a network. For example, the computer system may access a server 29 provided on the network (or, a storage provided on the network) using the network device 27.

The network design program is stored in the removable storage 28, for example, and is provided to the computer system. Alternatively, the network design program may be installed in advance in the computer system. The computer system may obtain the network design program from the server 29.

The computer system for realizing the network design apparatus 1 is not limited to the configuration illustrated in FIG. 4. For example, in a configuration in which all data relating to the information processing of the computer system is stored in the server 29, the computer system does not need to include the external storage 23 and/or the drive device 24.

FIG. 5 is a flowchart which illustrates a network design method according to the embodiments of the present invention. The processes in this flowchart are realized by executing the network design program in the execution by the CPU 21 illustrated in FIG. 4.

In S1, the design information input unit 11 obtains design information and stores the design information in the network information storage 12. The design information includes topology information, demand information, and TDM transmission line information, as described above.

In S2, the available demand information generator 13 generates available demand information for each of the TDM transmission lines. At this time, the available demand information generator 13 refers to the design information stored in the network information storage 12. Then, the available demand information generator 13 stores the generated available demand information in the available demand information storage 14.

In S3, the combination candidate generator 16 generates candidates for a combination of the TDM transmission lines for each demand. At this time, the selector 15 selects a plurality of demands one at a time in order according to a specified selection rule. In addition, the selector 15 selects one or more TDM transmission lines to be used for accommodating each of the selected demands. For example, the selector 15 selects TDM transmission lines with a band utilization efficiency higher than a specified threshold value. Then, the combination candidate generator 16 uses the TDM transmission lines selected by the selector 15 to generate candidates for a combination of the TDM transmission lines which will accommodate the demand. Namely, the candidates for the combination of the TDM transmission lines are generated using TDM transmission lines with a band utilization efficiency higher than the specified threshold value.

In S4, the TDM transmission line determination unit 17 determines a combination of TDM transmission lines which will accommodate the demand selected by the selector 15 from among the candidates generated by the combination candidate generator 16. In S5, the TDM transmission line determination unit 17 determines whether all of the demands are accommodated in the TDM transmission lines.

When all of the demands are accommodated in the TDM transmission lines, in S6, the result output unit 18 outputs a result obtained by the TDM transmission line determination unit 17. On the other hand, when there are demands which are not accommodated in the TDM transmission lines, in S7, the result output unit 18 outputs a message indicating that the network design has failed.

As described above, in the network design method according to the embodiments, candidates for a combination of TDM transmission lines are generated for a given demand, using TDM transmission lines with a band utilization efficiency higher than a specified threshold value. From among these candidates, a combination of the TDM transmission lines which will accommodate the demand is determined. Accordingly, a combination of the TDM transmission lines which is appropriate to efficiently accommodate the demand is determined from among a smaller number of candidates than the number of candidates in a method in which one combination is selected from among all of the combinations of the TDM transmission lines. Namely, with the network design method according to the embodiments, a combination of TDM transmission lines which efficiently accommodate a given demand can be easily determined.

First Embodiment

Figure 6:
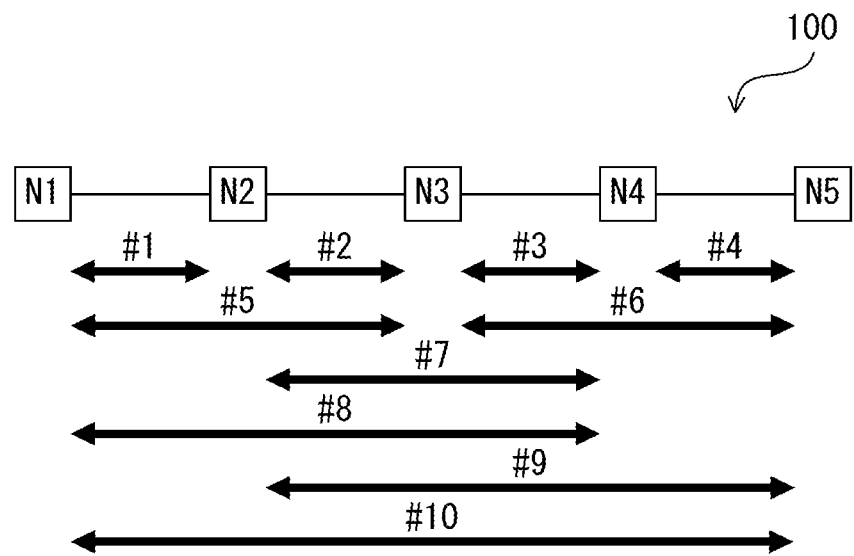
FIG. 6 illustrates an example of a network topology.

FIG. 6 illustrates a topology of a network which provides communication corresponding to a demand. Specifically, in the following descriptions, in a network 100 illustrated in FIG. 6, a given demand is accommodated in one or more TDM transmission lines.

The network 100 includes five nodes N1-N5. A physical link is respectively provided between the nodes N1 and N2, between the nodes N2 and N3, between the nodes N3 and N4, and between the nodes N4 and N5. Accordingly, the network 100 includes TDM transmission lines #1-#4 as illustrated in FIG. 6. The physical link is an optical fiber cable, for example. In each of the nodes N1-N5, an OADM is provided. As described above, the OADM can transmit a desired optical signal in a received optical WDM signal to the next node without terminating the signal (or, without converting the signal into an electrical signal). Accordingly, the network 100 includes TDM transmission lines #5-#10 in addition to the TDM transmission lines #1-#4.

FIGS. 7A and 7b illustrate an example of topology information. This topology information indicates a topology of the network 100 illustrated in FIG. 6. The topology information is stored in the network information storage 12 by the design information input unit 11.

The topology information includes a node list illustrated in FIG. 7A and a link list illustrated in FIG. 7B. In the node list, all of the nodes provided in the network 100 are registered. In the link list, each of the physical links is registered. Each of the physical links is expressed by a start point node and an end point node. When a link transmits a signal bidirectionally, the signal is transmitted from the start point node to the end point node, and the signal is also transmitted from the end point node to the start point node. In the link list, a transmission distance of each of the links and the number of available wavelengths in each of the links may be registered.

Figure 8:
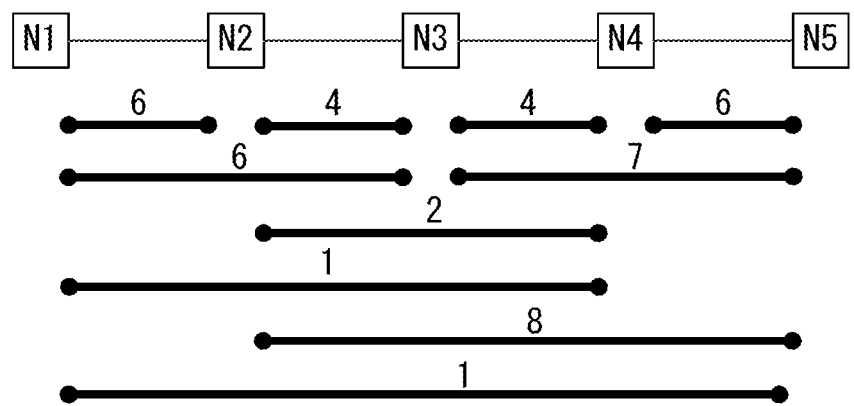
FIG. 8 illustrates an example of a demand.

FIG. 8 illustrates an example of a demand provided by a user. In this example, ten demands are provided to the network design apparatus 1. Hereinafter, a demand which transmits a signal between a node i and a node j is sometimes referred to as a "demand i-j". For example, a demand N1-N2 transmits data between nodes N1 and N2, and a demand N1-N5 transmits data between nodes N1 and N5. The number assigned to each of the demands in FIG. 8 indicates a bandwidth. For example, a bandwidth of the demand N1-N2 is "6", and a bandwidth of the demand N1-N5 is "1".

A bandwidth is expressed by the number of time slots of TDM. For example, when a bandwidth of a TDM transmission line is 10 Gbps and a TDM system includes eight time slots, one time slot corresponds to 1.25 Gbps. In this case, a bandwidth of a demand requesting 1.25 Gbps is expressed as "1," and a bandwidth of a demand requesting 2.5 Gbps is expressed as "2".

FIG. 9 illustrates an example of demand information. This demand information indicates ten demands illustrated in FIG. 8. The demand information is stored in the network information storage 12 by the design information input unit 11.

Each of the demands is expressed by a start point node, an end point node, a bandwidth, and a route. The start point node and the end point node identify nodes at both ends of the demand. When the demand is transmitting a signal bidirectionally, the signal is transmitted from the start point node to an end point node, and the signal is also transmitted from the end point note to the start point node.

In this example, the bandwidth is expressed by the number of slots of TDM. In this example, assume that there is a line of bandwidth=1 and a line of bandwidth=2. For example, a demand N1-N2 requests six lines of bandwidth=1 between the nodes N1 and N2. In this case, a total bandwidth of the demand N1-N2 is "6". A demand N2-N3 requests two lines of bandwidth=1 and one line of bandwidth=2. In this case, a total bandwidth of the demand N2-N3 is "4".

The route is expressed by a start point node, an end point node, and nodes on a route from the start point node to the end point node. As an example, a demand N1-N5 has a route from a node N1 though nodes N2, N3, and N4, in this order, to a node N5. The route may be expressed in other ways. For example, the route of the demand N1-N5 is expressed with links as the following:
N1-N2, N2-N3, N3-N4, N4-N5

Further, the route of the demand N1-N5 is expressed with nodes and links as the following:
N1, N1-N2, N2, N2-N3, N3, N3-N4, N4, N4-N5, N5

FIG. 10 illustrates an example of TDM transmission line information. Each of the TDM transmission lines is expressed by a start point node, an endpoint node, a capacity, and a route.

Hereinafter, a TDM transmission line which transmits a TDM signal between a node i and a node j is sometimes referred to as a "TDM transmission line i-j". The start point node, the end point node, and the route have substantially the same meanings as the start point node, the end point node, and the route of the demand information, and therefore the explanations are omitted. The capacity of the TDM transmission line indicates the capacity of data transmittable with one wavelength of a WDM optical signal. In this example, the capacity is expressed by the number of slots of the TDM similarly to the bandwidth of a demand. Also in this example, the capacities of all of the TDM transmission lines are the same. In this case, in the TDM transmission line information, a capacity does not need to be set individually for each of the TDM transmission lines. Alternatively, a specified capacity (e.g., 10 Gbps or 40 Gbps) may be set for each of the TDM transmission lines.

FIG. 11 illustrates an example of available demand information generated by the available demand information generator 13. The available demand information indicates an available demand list and a total bandwidth for each of the TDM transmission lines. Start point nodes and end point nodes as illustrated in FIG. 11 indicate TDM transmission lines.

An available demand of a TDM transmission line indicates a demand which includes an entire route of the TDM transmission line within a route of the demand. Namely, when a route of a demand includes the entirety of a route of a TDM transmission line, the demand is an available demand of the TDM transmission line. In other words, when the entirety of a TDM transmission line is available in order to realize a demand, the demand is an available demand of the TDM transmission line.

For example, a route of a TDM transmission line N1-N2 is "N1, N2". A route of a demand N1-N2 is "N1, N2". Namely, the route of the demand N1-N2 includes the entirety of the route of the TDM transmission line N1-N2. Accordingly, the demand N1-N2 is an available demand of the TDM transmission line N1-N2. A route of a demand N1-N3 is "N1, N2, N3". Namely, the route of the demand N1-N3 includes the entirety of the route of the TDM transmission line N1-N2. Accordingly, the demand N1-N3 is also an available demand of the TDM transmission line N1-N2. Similarly, each of a demand N1-N4 and a demand N1-N5 is also an available demand of the TDM transmission line N1-N2.

On the other hand, a route of a demand N2-N3 is "N2, N3". Namely, the route of the demand N2-N3 does not include the entirety of the route of the TDM transmission line N1-N2. Accordingly, the demand N2-N3 is not an available demand of the TDM transmission line N1-N2. Similarly, a demand N3-N4, a demand N4-N5, a demand N2-N4, a demand N3-N5, and a demand N2-N5 are not available demands of the TDM transmission line N1-N2.

The total bandwidth indicates the total of the respective bandwidths of available demands. For example, the TDM transmission line N1-N2 has four available demands N1-N2, N1-N3, N1-N4, and N1-N5. Namely, the TDM transmission line N1-N2 can be used by four demands N1-N2, N1-N3, N1-N4, and N1-N5. Here, the bandwidths of the demands N1-N2, N1-N3, N1-N4, and N1-N5 are 6, 6, 1, and 1, respectively, as illustrated in FIG. 9. Accordingly, a total bandwidth of the available demands of the TDM transmission line N1-N2 is 14. Similarly, for each of the TDM transmission lines, a total bandwidth of its available demands is calculated.

Figure 12:
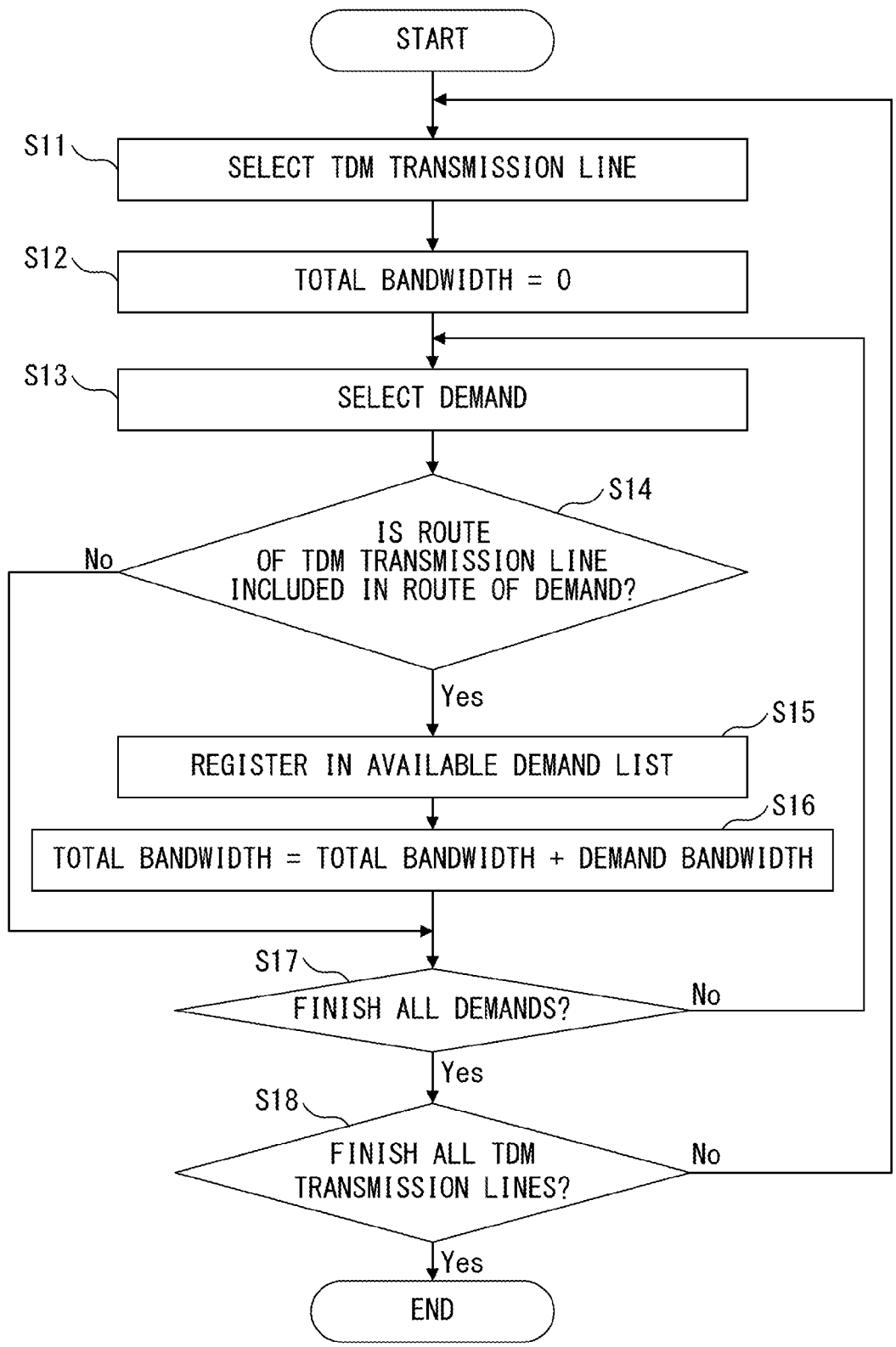
FIG. 12 is a flowchart which illustrates a process of an available demand information generator.

FIG. 12 is a flowchart illustrating a process of the available demand information generator 13. The process in this flowchart corresponds to S2 in FIG. 5.

In S11, the available demand information generator 13 selects one TDM transmission line from TDM transmission line information. Then, the available demand information generator 13 performs the processes of S12-S17 for the selected TDM transmission line.

In S12, the available demand information generator 13 initializes a total bandwidth to zero. In S13, the available demand information generator 13 selects one demand from demand information. In S14, the available demand information generator 13 determines whether a route of the selected demand includes a route of the TDM transmission line selected in S11.

In this example, the route is expressed by a list of nodes existing between the start point and the end point. Accordingly, when, in a list of nodes which indicates a route of a demand, all of the nodes indicating a route of a TDM transmission line are included in the same order or in the reverse order, it is determined that the route of the TDM transmission line is included in the route of the demand. Assume, for example, that a route of a TDM transmission line is "N2, N3, N4". In this case, not only when a route of a demand is expressed as "N1, N2, N3, N4, N5" but also when the route of the demand is expressed as "N5, N4, N3, N2, N1", it is determined that the route of the TDM transmission line is included in the route of the demand.

When the route of the TDM transmission line is included in the route of the demand, in S15, the available demand information generator 13 registers the demand in a list of available demands. Next, in S16, the available demand information generator 13 adds a bandwidth of the demand selected in S13 to the current total bandwidth. When the route of the TDM transmission line is not included in the route of the demand, S15-S16 are skipped.

S17 is provided for the purpose of performing the processes of S13-S16 for all of the demands in the demand information. When S13-S16 have been performed for all of the demands, the process of the available demand information generator 13 shifts to S18.

S18 is provided for the purpose of performing the processes of S11-S17 for all of the TDM transmission lines in the TDM transmission line information. When S11-S17 were performed to all of the TDM transmission lines, the process of the available demand information generator 13 is finished.

Figure 13:
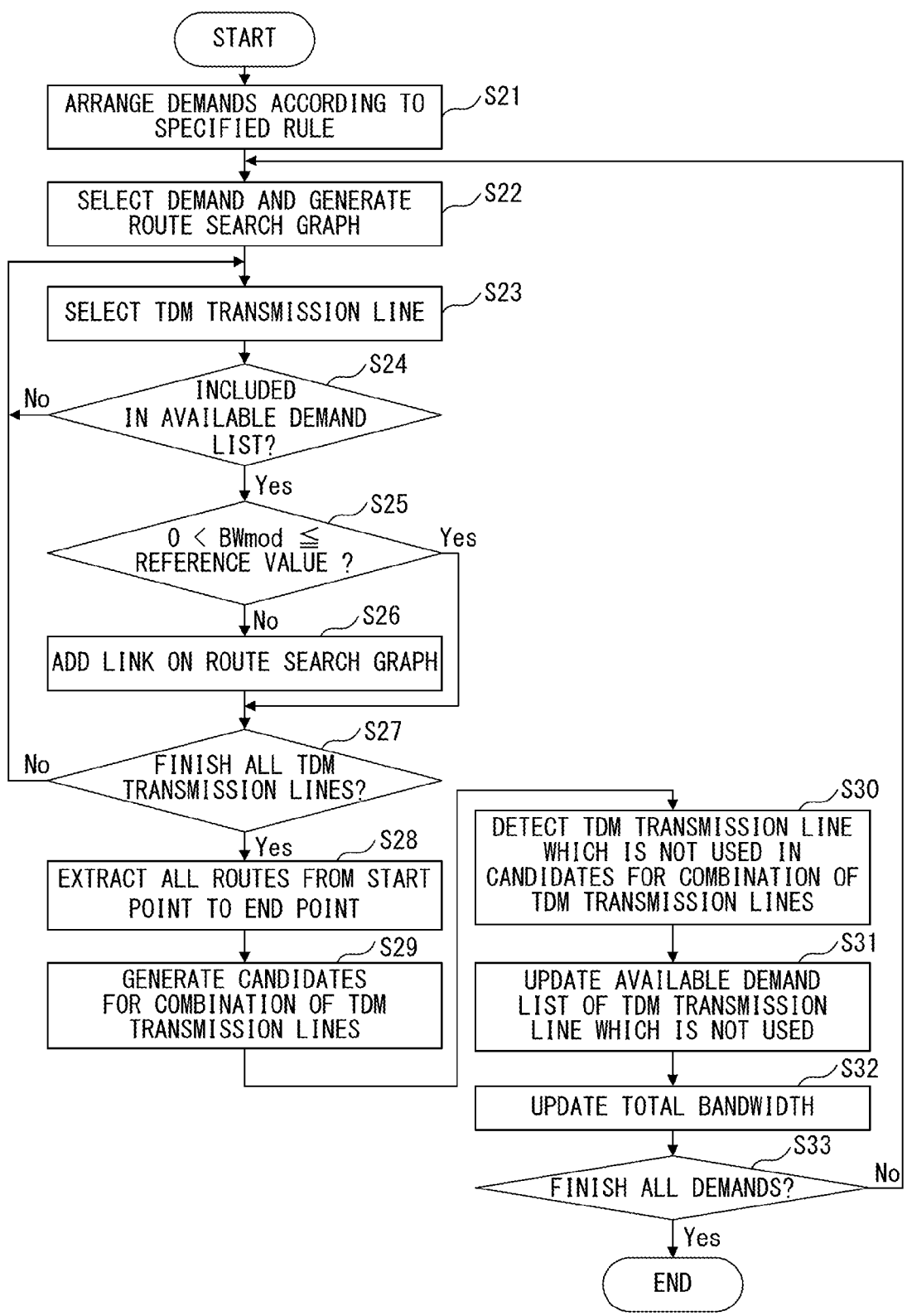
FIG. 13 is a flowchart which illustrates the process of a selector and a combination candidate generator.

FIG. 13 is a flowchart which illustrates the process of the selector 15 and the combination candidate generator 16. The process in this flowchart corresponds to S3 in FIG. 5.

In S21, the selector 15 arranges a plurality of given demands in accordance with a specified rule. In a first embodiment, the plurality of demands are arranged in descending order of the number of hops (or, the number of nodes on a route).

The number of hops indicates the number of links which are passed from a start point to an end point on a route of a demand. In this example, a "route" of the demand information is expressed by nodes on the route. Accordingly, the number of hops is obtained by subtracting "1" from the number of nodes described in the "route" of the demand information. For example, in the demand information of a demand N1-N3, a route "N1, N2, N3" is described. In this case, the number of hops=2 is obtained.

Figure 14:
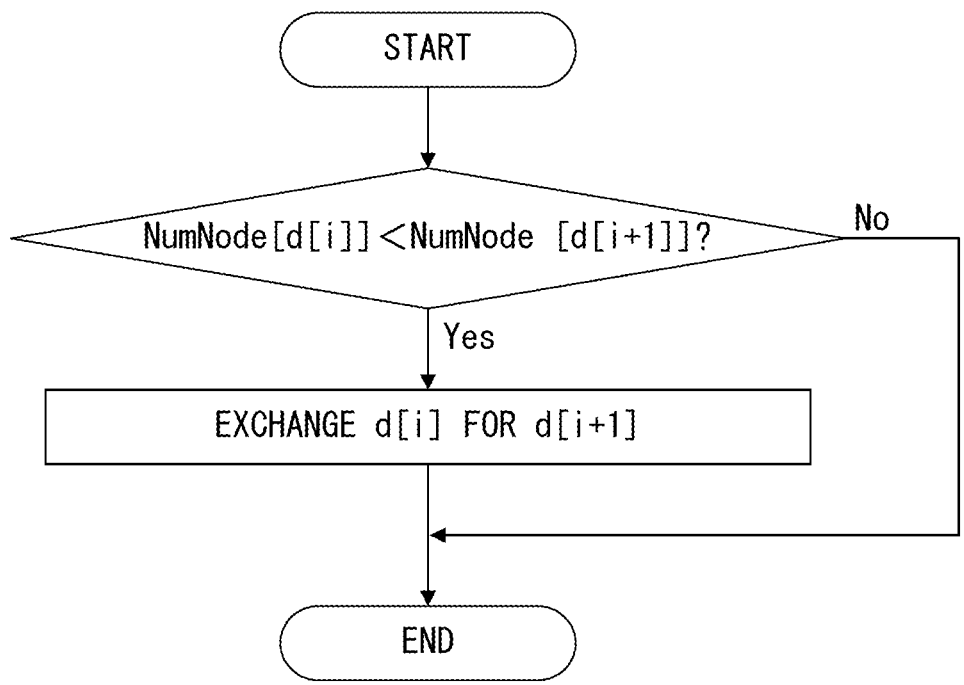
FIG. 14 is a flowchart which illustrates a demand rearrangement process according to a first embodiment.

FIG. 14 is a flowchart which illustrates a demand rearrangement process in the first embodiment. In this example, as the number of hops is obtained by subtracting 1 from the number of nodes on a route, the descending order of the number of nodes is the same as the descending order of the number of hops. Accordingly, when demands are arranged in descending order of the number of nodes, demands are arranged in descending order of the number of hops.

A variable NumNode[d] indicates the number of nodes described in the "route" of the demand information. For example, NumNode[d[i]] and NumNode[d[i+1]] indicate the numbers of nodes of a demand d[i] and a demand d[i+1], respectively. When NumNode[d[i]] is smaller than NumNode[d[i+1]], the demand d[i] and the demand d[i+1] are exchanged in a demand list which manages all of the given demands. The demand list may be generated from the demand information illustrated in FIG. 9.

The selector 15 performs the above rearrangement process for all of the demands. For example, when the above rearrangement process is performed for the demand information illustrated in FIG. 9, the result provided below is obtained. Note that demands with the same number of hops are in no particular order.

(1) Demand N1-N5
(2) Demand N1-N4
(3) Demand N2-N5
(4) Demand N1-N3
(5) Demand N2-N4
(6) Demand N3-N5
(7) Demand N1-N2
(8) Demand N2-N3
(9) Demand N3-N4
(10) Demand N4-N5

In S22, the selector 15 selects the demand with the maximum number of hops. Then, the combination candidate generator 16 generates a route search graph for the demand selected by the selector 15.

In this example, a demand N1-N5 is selected first. On a route of the demand N1-N5, five nodes N1, N2, N3, N4, and N5 exist as illustrated in FIG. 9. In this case, a generated route search graph is expressed by the five nodes N1, N2, N3, N4, and N5, as illustrated in FIG. 15.

After this, the selector 15 and the combination candidate generator 16 perform the processes of S23-S32 for the demand selected in S22. Accordingly, hereinafter, the demand selected in S22 is sometimes referred to as a "target demand".

In S23, the selector 15 selects one TDM transmission line from the TDM transmission line information. After this, the selector 15 and the combination candidate generator 16 perform the processes of S24-S26 for the selected TDM transmission line. Accordingly, hereinafter, the TDM transmission line selected in S23 is sometimes referred to as a "target TDM transmission line".

In S24, the selector 15 determines whether a target demand is included in an available demand list of a target TDM transmission line. Assume, for example, that the target demand is a demand N1-N5 and the target TDM transmission line is a TDM transmission line N1-N2. In this case, in the available demand information illustrated in FIG. 11, the demand N1-N5 is included in the available demand list of the TDM transmission line N1-N2. In this case, the determination in S24 is "Yes". When the target demand is included in the available demand list of the target TDM transmission line, the process of S25 is performed. When it is not included in the list (S24: No), the process of the selector 15 returns to S23.

In S25, the selector 15 calculates a "remainder" obtained by dividing a total bandwidth of available demands of the target TDM transmission line by a reference capacity. Hereinafter, this "remainder" is referred to as a "BWmod". The reference capacity indicates the capacity of one TDM transmission line (e.g., the capacity of data which one wavelength of a WDM optical signal can transmit), and in this example, the reference capacity is "8". Namely, BWmod indicates a bandwidth used in a final TDM transmission line when available demands are sequentially accommodated in TDM transmission lines.

For example, a total bandwidth of available demands of the TDM transmission line N1-N2 is 14, as illustrated in FIG. 11. In this case, two TDM transmission lines are needed in order to accommodate all of the available demands. At this time, the entirety of the capacity of a first TDM transmission line is used. However, "6" of the capacity of a second TDM transmission line is used. Namely, a bandwidth which is used in the second TDM transmission line is calculated by dividing 14 by 8 and obtaining "remainder=6".

As described above, the BWmod indicates band utilization efficiency. For example, BWmod=0 indicates that 100% of the capacity of all of the TDM transmission lines is used. BWmod=1 indicates that there is a TDM transmission line with a band utilization efficiency of ⅛ (i.e., 12.5%). In S25, the selector 15 determines whether the band utilization efficiency of the target TDM transmission line is high, using the BWmod and a specified reference value. Namely, when 0<BWmod≤reference value, it is determined that the band utilization efficiency of the target TDM transmission line is low.

FIG. 16 illustrates extracted TDM transmission lines and their corresponding BWmod values. In this example, the reference value is "4". Then, in the example illustrated in FIG. 16, it is determined that the band utilization efficiencies of TDM transmission lines N2-N4, N1-N4, N2-N5, and N1-N5 are low.

When the band utilization efficiency of the target TDM transmission line is high (S25: No), in S26, the combination candidate generator 16 adds a link indicating the target TDM transmission line on a route search graph. On the other hand, when the band utilization efficiency of the target TDM transmission line is low (S25: Yes), S26 is skipped.

S27 is provided for the purpose of performing the processes of S24-S26 for all of the TDM transmission lines in the TDM transmission line information. Accordingly, the processes of S24-S26 are performed for all of the TDM transmission lines.

FIGS. 17A-17D illustrate a process of adding a link on the route search graph. Here, the processes of S24-S26 are performed for each of the TDM transmission lines illustrated in FIG. 16. Further, the reference value for determining the band utilization efficiency is "4".

Figure 17A:
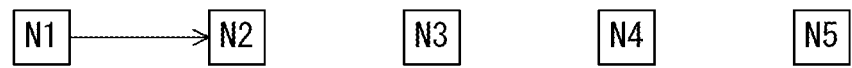
FIGS. 17A-17D illustrate a process of adding a link on the route search graph.

BWmod of the TDM transmission line N1-N2 is greater than the reference value. Accordingly, a link corresponding to the TDM transmission line N1-N2 is added on the route search graph. As a result, a route search graph as illustrated in FIG. 17A is obtained.

Figure 17B:
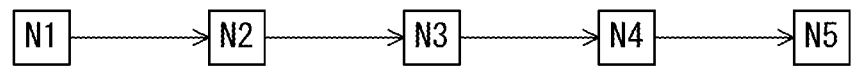

BWmod of each of the TDM transmission lines N2-N3, N3-N4, and N4-N5 is greater than the reference value. Accordingly, links corresponding to the TDM transmission lines N2-N3, N3-N4, and N4-N5 are respectively added on the route search graph. As a result, a route search graph as illustrated in FIG. 17B is obtained.

Figure 17C:
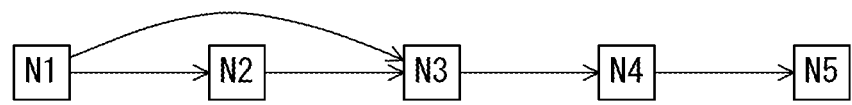
Figure 17D:
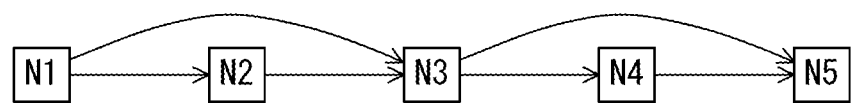

Similarly, a link corresponding to the TDM transmission line N1-N3 is added and a route search graph as illustrated in FIG. 17C is obtained. Further, a link corresponding to the TDM transmission line N3-N5 is added and a route search graph as illustrated in FIG. 17D is obtained. However, it is determined that the band utilization efficiencies of the TDM transmission lines N2-N4, N1-N4, N2-N5, and N1-N5 are low. Accordingly, links corresponding to the TDM transmission lines N2-N4, N1-N4, N2-N5, and N1-N5 are not added on the route search graph.

Return to FIG. 13. In S28, the combination candidate generator 16 performs a route search in a route search graph corresponding to the target demand. Namely, the combination candidate generator 16 extracts all of the routes from a start point to an endpoint of the route search graph. When the route search graph as illustrated in FIG. 17D is provided, four routes as illustrated in FIG. 18 are extracted. Specifically, the four routes (1)-(4) provided below are obtained.
(1) N1, N2, N3, N4, N5
(2) N1, N2, N3, N5
(3) N1, N3, N4, N5
(4) N1, N3, N5

In S29, the combination candidate generator 16 generates candidates for a combination of TDM transmission lines based on the respective routes extracted as a result of the process described above. In this example, the four candidates provided below are generated.
(1) N1-N2, N2-N3, N3-N4, N4-N5
(2) N1-N2, N2-N3, N3-N5
(3) N1-N3, N3-N4, N4-N5
(4) N1-N3, N3-N5

As described above, in the network design method according to the first embodiment, the number of TDM transmission lines which are considered at the time of generating candidates for a combination of TDM transmission lines which will accommodate a given demand is reduced by performing the processes of S24 and S25. In other words, when the processes of S24 and S25 are not performed, all of the TDM transmission lines #1-#10 illustrated in FIG. 6 are considered in a search for a route from a start point to an end point of a demand N1-N5, for example. In this case, as a combination of TDM transmission lines which will accommodate the demand N1-N5, the eight candidates provided below are generated.
(1) N1-N2, N2-N3, N3-N4, N4-N5
(2) N1-N2, N2-N3, N3-N5
(3) N1-N2, N2-N4, N4-N5
(4) N1-N3, N3-N4, N4-N5
(5) N1-N3, N3-N5
(6) N1-N4, N4-N5
(7) N1-N2, N2-N5
(8) N1-N5

Namely, in the network design method according to the embodiment, the number of candidates for a combination of TDM transmission lines is reduced. Accordingly, when one combination is determined from among the candidates for the combination of TDM transmission lines in S4 of FIG. 5, the number of calculations is reduced.

In S30, the combination candidate generator 16 detects TDM transmission lines which are not used in the candidates for the combination of TDM transmission lines. Here, these TDM transmission lines which are not used in the candidates will not be used for accommodating the target demand. These TDM transmission lines which are not used in the candidates correspond to the TDM transmission lines which are determined to have a low band utilization efficiency in S25.

In S31-S32, the combination candidate generator 16 updates the available demand lists and the total bandwidths of the TDM transmission lines detected in S30. In this example, the four candidates described above are generated for the target demand N1-N5. The TDM transmission lines N2-N4, N1-N4, N2-N5, and N1-N5 are not included in any of the candidates. Accordingly, in the available demand information, the available demand lists and the total bandwidths corresponding to the TDM transmission lines N2-N4, N1-N4, N2-N5, and N1-N5 are respectively updated. Specifically, as illustrated in FIG. 19, the target demand (here, a demand N1-N5) is deleted from the available demand lists corresponding to the TDM transmission lines N2-N4, N1-N4, N2-N5, and N1-N5. Further, a bandwidth of the target demand (i.e., a bandwidth "1" of the demand N1-N5) is subtracted from the total bandwidths corresponding to the TDM transmission lines N2-N4, N1-N4, N2-N5, and N1-N5.

S33 is provided for the purpose of performing the processes of S22-S32 for all of the demands. Accordingly, the processes of S22-S32 are respectively performed for all of the demands. Explained below is an example in which candidates for a combination of TDM transmission lines corresponding to each of the demands are generated by performing the processes of S22-S32 for each of the demands.

When a demand N1-N4 is selected after the demand N1-N5, the selector 15 and the combination candidate generator 16 perform the processes provided below. At this time, the available demand information has been updated to the state illustrated in FIG. 19.

When the demand N1-N4 is selected, TDM transmission lines including the demand N1-N4 as an available demand are extracted from the available demand information illustrated in FIG. 19. As a result, six TDM transmission lines as illustrated in FIG. 20A are selected. Then, BWmod is calculated for each of the extracted TDM transmission lines. In this example, the BWmod of the TDM transmission line N2-N4 and N1-N4 are smaller than or equal to the reference value. Namely, the TDM transmission lines N2-N4 and N1-N4 are not added on the route search graph since the band utilization efficiency is low.

On the route search graph, links corresponding to TDM transmission lines with BWmod larger than the reference value are added. Namely, links corresponding to TDM transmission lines (N1-N2, N2-N3, N3-N4, and N1-N3) which have the high band utilization efficiency at the time of accommodating the demand N1-N4 are added on the route search graph. As a result, a route search graph illustrated in FIG. 20B is obtained.

On this route search graph, a route from a start point N1 to an end point N4 is searched. As a result, as illustrated in FIG. 20C, two routes are obtained. Accordingly, candidates for a combination of TDM transmission lines for the demand N1-N4 are the following two:
(1) N1-N2, N2-N3, N3-N4
(2) N1-N3, N3-N4

Then, in the available demand information illustrated in FIG. 19, the available demand lists and the total bandwidths are updated. Specifically, the demand N1-N4 is deleted from the available demand list for each of the TDM transmission lines N2-N4 and N1-N4. Additionally, a bandwidth "1" of the demand N1-N4 is subtracted from the total bandwidth for each of the TDM transmission lines N2-N4 and N1-N4. As a result, the available demand information is updated to the state illustrated in FIG. 21.

When a demand N2-N5 is selected after the demand N1-N4, the selector 15 and the combination candidate generator 16 perform the processes provided below. At this time, the available demand information has been updated to the state illustrated in FIG. 21.

When the demand N2-N5 is selected, TDM transmission lines including the demand N2-N5 as an available demand are extracted from the available demand information illustrated in FIG. 21. As a result, six TDM transmission lines as illustrated in FIG. 22A are selected. Then, BWmod is calculated for each of the extracted TDM transmission lines. In this example, the BWmod of the TDM transmission line N2-N4 is smaller than or equal to the reference value. Namely, the TDM transmission line N2-N4 is not added on a route search graph, as the band utilization efficiency is low.

On the route search graph, links corresponding to TDM transmission lines (N2-N3, N3-N4, N4-N5, N3-N5, and N2-N5) with BWmod larger than the reference value are added. As a result, a route search graph illustrated in FIG. 22B is obtained. On this route search graph, routes from a start point N2 to an end point N5 are searched. Then, as illustrated in FIG. 22C, three routes are obtained. Accordingly, candidates for a combination of TDM transmission lines for the demand N2-N5 are the following three:
(1) N2-N3, N3-N4, N4-N5
(2) N2-N3, N3-N5
(3) N2-N5

Then, in the available demand information illustrated in FIG. 21, the available demand lists and the total bandwidths are updated. Specifically, the demand N2-N5 is deleted from the available demand list of the TDM transmission line N2-N4. Additionally, the bandwidth "8" of the demand N2-N5 is subtracted from the total bandwidth of the TDM transmission line N2-N4. As a result, the available demand information is updated to the state illustrated in FIG. 23.

When a demand N1-N3 is selected after the demand N2-N5, the selector 15 and the combination candidate generator 16 perform the processes provided below. At this time, the available demand information has been updated to the state illustrated in FIG. 23.

When the demand N1-N3 is selected, TDM transmission lines including the demand N1-N3 as an available demand are extracted from the available demand information illustrated in FIG. 23. As a result, three TDM transmission lines as illustrated in FIG. 24A are selected. Then, BWmod is calculated for each of the extracted TDM transmission lines. In this example, there are no TDM transmission lines with a BWmod smaller than or equal to the reference value.

On a route search graph, links corresponding to TDM transmission lines (N1-N2, N2-N3, and N1-N3) with BWmod larger than the reference value are added. As a result, a route search graph illustrated in FIG. 24B is obtained. On this route search graph, routes from a start point N1 to an end point N3 are searched. Then, as illustrated in FIG. 24C, two routes are obtained. Accordingly, candidates for a combination of TDM transmission lines for the demand N1-N3 are the following two:
(1) N1-N2, N2-N3
(2) N1-N3

For the demand N1-N3, there are no TDM transmission lines with BWmod smaller than or equal to the reference value, as illustrated in FIG. 24A. Accordingly, the available demand information is not updated.

When a demand N2-N4 is selected after the demand N1-N3, the selector 15 and the combination candidate generator 16 perform the processes provided below. At this time, the available demand information has been updated to the state illustrated in FIG. 23.

When the demand N2-N4 is selected, TDM transmission lines including the demand N2-N4 as an available demand are extracted from the available demand information illustrated in FIG. 23. As a result, three TDM transmission lines as illustrated in FIG. 25A are selected. Then, BWmod is calculated for each of the extracted TDM transmission lines. In this example, the BWmod of a TDM transmission line N2-N4 is smaller than or equal to the reference value. Namely, the TDM transmission line N2-N4 is not added on a route search graph, as the band utilization efficiency is low.

On the route search graph, links corresponding to TDM transmission lines (N2-N3 and N3-N4) with BWmod larger than the reference value are added. As a result, a route search graph illustrated in FIG. 25B is obtained. On this route search graph, routes from a start point N2 to an end point N4 are searched. Then, a route illustrated in FIG. 25C is obtained. Accordingly, a candidate for a combination of TDM transmission lines for the demand N2-N4 is the following one:

(1) N2-N3, N3-N4

After this, in the available demand information illustrated in FIG. 23, the available demand lists and the total bandwidths are updated. Specifically, the demand N2-N4 is deleted from the available demand list of the TDM transmission line N2-N4. Additionally, the bandwidth "2" of the demand N2-N4 is subtracted from the total bandwidth of the TDM transmission line N2-N4. As a result, the available demand information is updated to the state illustrated in FIG. 26.

When a demand N3-N5 is selected after the demand N2-N4, the selector 15 and the combination candidate generator 16 perform the processes provided below. At this time, the available demand information has been updated to the state illustrated in FIG. 26.

Figure 26:
FIG. 26 illustrates updated available demand information in the process for the demand N2-N4.

When the demand N3-N5 is selected, TDM transmission lines including the demand N3-N5 as an available demand are extracted from the available demand information illustrated in FIG. 26. As a result, three TDM transmission lines illustrated in FIG. 27A are selected. Then, BWmod is calculated for each of the extracted TDM transmission lines. In this example, there are no TDM transmission lines with BWmod smaller than or equal to the reference value.

On a route search graph, links corresponding to TDM transmission lines (N3-N4, N4-N5, and N3-N5) with BWmod larger than the reference value are added. As a result, a route search graph illustrated in FIG. 27B is obtained. On this route search graph, routes from a start point N3 to an end point N5 are searched. Then, as illustrated in FIG. 27C, two routes are obtained. Accordingly, candidates for a combination of TDM transmission lines for the demand N3-N5 are the following two:

(1) N3-N4, N4-N5
(2) N3-N5

There are no TDM transmission lines with BWmod smaller than or equal to the reference value for the demand N3-N5, as illustrated in FIG. 27A. Accordingly, the available demand information is not updated.

After this, candidates for a combination of TDM transmission lines are generated for each of a demand N1-N2, a demand N2-N3, a demand N3-N4, and a demand N4-N5. A route for each of these demands is 1 hop. Accordingly, each of these demands is accommodated in one TDM transmission line. Namely, a candidate for a combination of TDM transmission lines for each of the demand N1-N2, the demand N2-N3, the demand N3-N4, and the demand N4-N5 are as follows.

Demand N1-N2: A candidate for a combination of TDM transmission lines is N1-N2.
Demand N2-N3: A candidate for a combination of TDM transmission lines is N2-N3.
Demand N3-N4: A candidate for a combination of TDM transmission lines is N3-N4.
Demand N4-N5: A candidate for a combination of TDM transmission lines is N4-N5.

As described above, candidates for a combination of TDM transmission lines are generated for each of the demands. Then, the TDM transmission line determination unit 17 determines a combination of TDM transmission lines from among the corresponding candidates for each of the demands. This process is performed in S4 of FIG. 5.

A method for determining TDM transmission lines which will accommodate a given demand is not particularly limited, but a known art may be used. Described below is an example.

Assume, for example, that an OADM is provided in all nodes (e.g., telephone exchanges) on a network. Also assume that K demands are provided. Further, assume that the number of nodes (including a start point node and an end point node) on a route from a start point to an end point of a demand j (j=1, . . . , K) is $n_j$. In this case, the number of combinations of TDM transmission lines which will accommodate the demand j is expressed as the following:

$$2^{(n_j-2)}$$

Here, each of the demands can select combinations of TDM transmission lines independently from other demands. Accordingly, the number of the combinations of TDM transmission lines which will accommodate all of the demands is expressed as the following:

$$2^{(n_1-2)} \times 2^{(n_2-2)} \times \ldots \times 2^{(n_K-2)}$$

Demands which select a TDM transmission line across the same section in a combination of TDM transmission lines selected for each of the demands can be multiplexed in the same TDM transmission line within the capacity of the TDM transmission line. Accordingly, there is a solution in which the number of the TDM transmission lines needed for accommodating the demand is minimum in these combinations. As a method for obtaining this solution, mixed integer programming has been known.

An objective function for obtaining the solution in which a cost of a TDM transmission line is lowest is expressed as below. m expresses a capacity menu of a TDM transmission line. The capacity menu is defined such that for 1, capacity=8; for m=2, capacity=32. h expresses a number of a TDM transmission line. $x_m(h)$ expresses the number of the TDM transmission lines h of the capacity menu m. $cost_m$ expresses a cost of the TDM transmission line of the capacity menu m.

$$\text{minimize} \sum_m \left\{ \sum_h cost_m x_m(h) \right\} (\text{for } \forall m, \forall h)$$

Constraint conditions regarding a demand are expressed as follows:

$$\sum_t T(g, t) \cdot d(t) = numberOfDemands (\text{for } \forall g)$$

A variable T (g,t) is defined as follows. Namely, if a demand g can be accommodated in a candidate for a combination of TDM transmission lines t, T(g,t)=1. If not, T(g,t)=0. d(t) expresses the number of demands which are accommodated in the candidate for a combination of TDM transmission lines t. numberOfDemands expresses the number of demands g. Accordingly, the constraint conditions provided above means that each of the demands is necessarily accommodated in any of the combinations of TDM transmission lines.

The constraint conditions of the capacity for each of the TDM transmission lines are expressed as follows:

$$\sum_{t} \text{Demand\_Cap}(t) \cdot I(h, t) \cdot d(t) - \sum_{m} \text{TDM\_CAP} \cdot x_m(h) \leq 0$$

(for $\forall\ h$)

Demand_Cap(t) expresses a demand bandwidth in a demand accommodation pattern t. If a TDM transmission line h is included in a candidate for a combination of TDM transmission lines t, I(h,t)=1. If not, I(h,t)=0. Therefore, a first term expresses a total bandwidth of demands which are accommodated in the TDM transmission line h. TDM_CAP(m) expresses the capacity of a TDM transmission line of a capacity menu m. A second term expresses a total capacity of the TDM transmission lines h of the capacity menu m. Namely, the constraint conditions of the capacity of the TDM transmission line means the state in which the total bandwidth of demands which are accommodated in the TDM transmission line does not exceed the total capacity of the TDM transmission lines.

A constraint expression of the limitation of the number of wavelengths of a link is expressed as follows:

$$\sum_{h} \left[ \text{Link}(s, h) \cdot \left\{ \sum_{m} x_m(h) \right\} \right] \leq \text{Wavelength}(s) \text{(for } \forall\ s)$$

When the TDM transmission line h passes a link s, Link(s, h)=1. When it does not, Link(s,h)=0. Accordingly, the left member of this constraint expression expresses the total number of the TDM transmission lines which pass the link s. Wavelength(s) expresses the number of available wavelengths in the link s. For example, when a network is redesigned, the value of Wavelength(s) is changed.

The number of TDM transmission lines $x_m$(h) is obtained by solving the objective function and the three constraint conditional expressions provided above with mixed integer programming. A solution of the mixed integer programming has been well-known, and is described in the document below, for example.

Masatoshi Sakawa, *Optimization of Discrete System*, Japan, Morikita Publishing Co., Ltd., May 2000

In determining a combination of TDM transmission lines which will accommodate a demand with the method described above, when the number of combination candidates is large, the range of t widens. Here, in the network design method according to the embodiment, combination candidates are generated using TDM transmission lines with a band utilization efficiency higher than a specified threshold. Therefore, the range of t becomes narrower and the calculation for determining a combination of TDM transmission lines which will accommodate a demand becomes simpler.

As described above, in the network design method according to the first embodiment, candidates for a combination of TDM transmission lines which will accommodate a demand are generated using TDM transmission lines with a band utilization efficiency higher than the threshold. Accordingly, the number of candidates for a combination of TDM transmission lines is smaller than that in a method in which a combination of TDM transmission lines which will accommodate a demand is determined after considering all of the combinations of TDM transmission lines. As a result, the calculation time needed for determining a combination of TDM transmission lines which will accommodate a demand becomes shorter, and the memory capacity for this purpose becomes smaller.

In the first embodiment, demands are sequentially selected in descending order of the number of hops of a route of a demand (or, the number of nodes on the route), and combination candidates are generated. Here, when combination candidates for a demand are generated, available demand information is updated in order to generate combination candidates for the next demand. At this time, when a demand with a large number of hops is processed, more information may be deleted from the available demand information. Accordingly, when a demand with a large number of hops is processed first, the efficiency of a process of generating candidates for a combination of TDM transmission lines corresponding to each of the demands becomes higher.

Second Embodiment

In the first embodiment, in the flowchart illustrated in FIG. 13, demands are selected one at a time in descending order of the number of hops, and candidates for a combination of TDM transmission lines are generated for each of the selected demands. On the other hand, in a second embodiment, demands are selected one at a time in descending order of the transmission distance from a start point to an end point, and candidates for a combination of TDM transmission lines are generated for each of the selected demands.

FIG. 28 illustrates an example of a link list of topology information used in the second embodiment. In the second embodiment, the transmission distance of each link is recorded in the link list of topology information. The transmission distance of each link is measured in advance by a network administrator, for example.

FIG. 29A is a flowchart which illustrates a network design method according to the second embodiment. In the second embodiment, S41 is performed between S1 and S2 in the flowchart illustrated in FIG. 5. In a link list of demand information which is input in S1, the transmission distance of each link is recorded as illustrated in FIG. 28.

In S41, the selector 15 refers to the link list of demand information and calculates the transmission distance of each demand. Then, the selector 15 adds information indicating the calculated transmission distance to the demand information.

FIG. 29B is a flowchart which illustrates a demand rearrangement process according to the second embodiment. The process of this flowchart corresponds to S21 in FIG. 13. Length[d] expresses the transmission distance of a route of a demand. For example, Length[d[i]] and Length[d[i+1]] respectively express the transmission distances of the routes of a demand d[i] and a demand d[i+1]. As illustrated in FIG. 29B, when Length[d[i]] is shorter than Length[d[i+1]], Length[d[i]] and Length[d[i+1]] are exchanged in a demand list which manages all demands.

The selector 15 performs the rearrangement process described above for all of the demands. For example, when a link list illustrated in FIG. 28 is provided, performing the rearrangement process described above for the demand information illustrated in FIG. 9 yields the following result.

(1) Demand N1-N5
(2) Demand N2-N5
(3) Demand N1-N4
(4) Demand N2-N4
(5) Demand N1-N3
(6) Demand N3-N5

(7) Demand N2-N3
(8) Demand N3-N4
(9) Demand N4-N5
(10) Demand N1-N2

As described above, the first and second embodiments are different from each other in the process of rearranging demands. The other processes are substantially the same in the first and second embodiments.

In the first embodiment, when the numbers of hops of the plurality of demands are the same, the order of processing these demands depends on implementations. On the other hand, in the second embodiment, the order of processing each of the demands is determined according to the transmission distance of a route of each of the demands. Here, it is rare for the transmission distances of the routes of each of the demands to be the same as each other. Accordingly, the order of processing of each of the demands is uniquely determined without depending on the implementations.

Third Embodiment

In the first embodiment, in the flowchart illustrated in FIG. 13, demands are selected one at a time in descending order of the number of hops, and candidates for a combination of TDM transmission lines are generated for each of the selected demands. On the other hand, in a third embodiment, demands are selected one at a time in descending order of the number of demand termination nodes on a route.

Figure 30A:
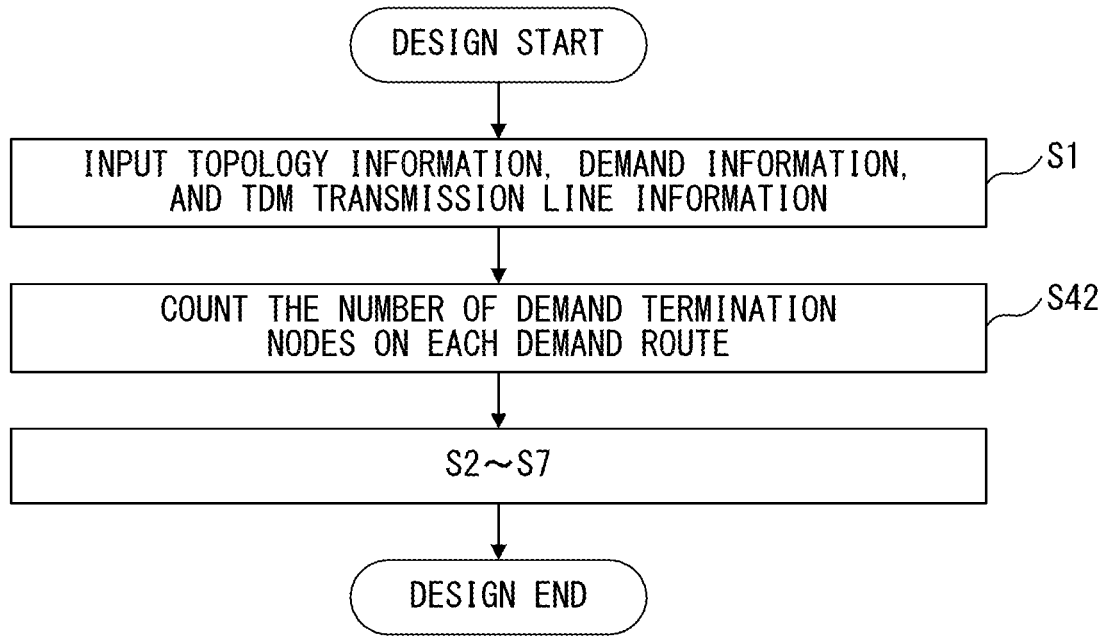
FIGS. 30A and 30B are flowcharts which illustrate a process according to a third embodiment.

FIG. 30A is a flowchart which illustrates a network design method according to the third embodiment. In the third embodiment, S42 is performed between S1 and S2 in the flowchart illustrated in FIG. 5.

In S42, the selector 15 counts the number of demand termination nodes on a route for each demand. The demand termination node includes a start point node and an end point node of a demand. For example, in FIG. 9, a demand termination node of a demand N1-N2 is a node N1 and a node N2. The selector 15 adds information indicating the number of demand termination nodes to demand information.

Figure 30B:
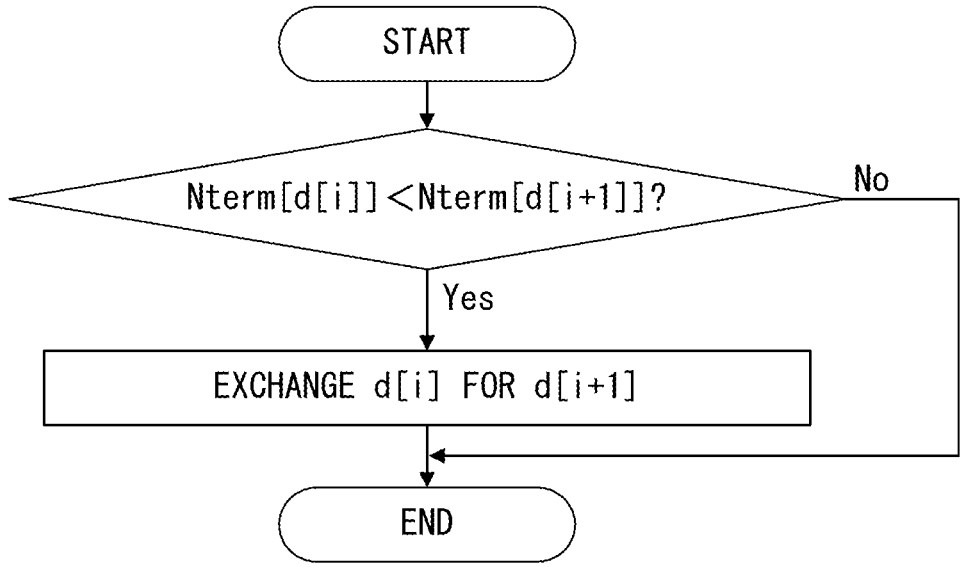

FIG. 30B is a flowchart which illustrates a demand rearrangement process according to the third embodiment. The process of this flowchart corresponds to S21 in FIG. 13. Nterm[d] expresses the number of demand termination nodes on a route of a demand. For example, Nterm[d[i]] and Nterm[d[i+1]] respectively express the number of demand termination nodes on the routes of a demand d[i] and a demand d[i+1]. When Nterm[d[i]] is smaller than Nterm[d[i+1]], the demand d[i] and the demand d[i+1] are exchanged in a demand list which manages all of the demands.

The selector 15 performs the rearrangement process described above for all of the demands. For example, when the rearrangement process described above is performed for the demand information illustrated in FIG. 9, a result similar to the result in the first embodiment is obtained.

Figure 31:
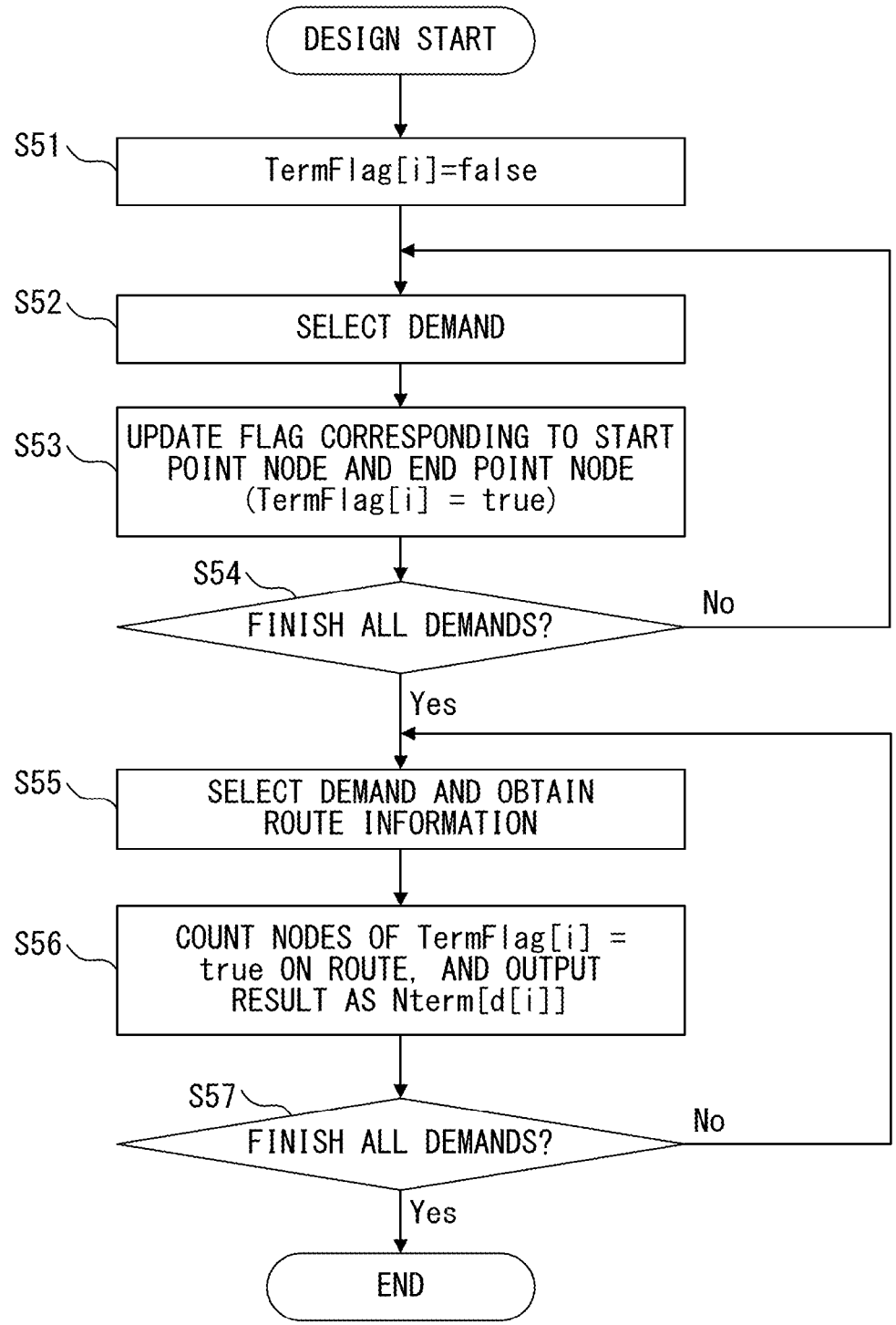
FIG. 31 is a flowchart which illustrates a process of counting the number of demand termination nodes.

FIG. 31 is a flowchart which illustrates a process of counting the number of demand termination nodes. This process corresponds to S42 in FIG. 30A.

In S51, the selector 15 initializes flag information TermFlag[i]. The flag information is prepared for each of the nodes and a variable i identifies each of the nodes. For example, in the example illustrated in FIG. 8, TermFlag[N1] to TermFlag[N5] are prepared for nodes N1 to N5, respectively.

In S52-S54, the selector 15 selects the provided demands one at a time. Then, the selector 15 updates flag information corresponding to a start point node and an endpoint node of the selected demand to "true". For example, when a demand N1-N2 illustrated in FIG. 8 is selected, TermFlag[N1] and TermFlag[N2] are respectively updated to "true".

In S55-S57, the selector 15 selects the provided demands one at a time and obtains route information for the selected demand. Next, the selector 15 obtains flag information corresponding to each of the nodes on a route of the selected demand. Then, the selector 15 counts the number of TermFlags which have been updated to "true" in the flag information obtained for the selected demand. This result corresponds to Nterm[d[i]] illustrated in FIG. 30B and indicates the number of demand termination nodes on the route of the demand.

As described above, the first and third embodiments are different from each other in the process of rearranging demands. The other processes are substantially the same in the first and third embodiments.

In the third embodiment, demands are processed in descending order of the number of demand termination nodes on a route. Accordingly, for example, even when TDM transmission lines are set only between demand termination nodes, it is possible to appropriately determine a combination of the TDM transmission lines which will accommodate each demand.

Fourth Embodiment

In the first embodiment, in the flowchart illustrated in FIG. 13, demands are selected one at a time in descending order of the number of hops and candidates for a combination of TDM transmission lines are generated for the selected demand. On the other hand, in a fourth embodiment, demands are selected one at a time in descending order of the number of TDM transmission lines included in a route of a demand.

FIG. 32A is a flowchart which illustrates a network design method according to the fourth embodiment. In the fourth embodiment, S43 is performed between S1 and S2 in the flowchart illustrated in FIG. 5.

In S43, the selector 15 counts the number of TDM transmission lines included in a route for each of the demands. For example, a route of a demand N1-N3 includes a TDM transmission line N1-N2, a TDM transmission line N2-N3, and a TDM transmission line N1-N3. When a demand is an available demand for a TDM transmission line, the TDM transmission line is included in the route of the demand. Then, the selector 15 adds information indicating the number of TDM transmission lines to the demand information.

For example, in the examples illustrated in FIGS. 6-10, the number of TDM transmission lines included in a route of a demand N1-N5 is 10. The number of TDM transmission lines included in each of the demands N1-N4 and N2-N5 is 6. The number of TDM transmission lines included in a route of each of the demands N1-N3, N2-N4, and N3-N5 is 3. The number of TDM transmission lines included in a route of each of the demands N1-N2, N2-N3, N3-N4, and N4-N5 is 1.

FIG. 32B is a flowchart which illustrates a demand rearrangement process according to the fourth embodiment. The process of this flowchart corresponds to S21 in FIG. 13. Nline[d] expresses the number of TDM transmission lines included in a route of a demand. For example, Nline[d[i]] and Nline[d[i+1]] respectively express the numbers of TDM transmission lines included in routes of a demand d[i] and a demand d[i+1]. When Nline[d[i]] is smaller than Nline[d[i+1]], the demand d[i] and the demand d[i+1] are exchanged in the demand list which manages all of the demands.

The selector 15 performs the rearrangement process illustrated in FIG. 32B for all of the demands. For example, when the rearrangement process described above is performed for the demand information illustrated in FIG. 9, a result similar to the result in the first embodiment is obtained.

Figure 33:
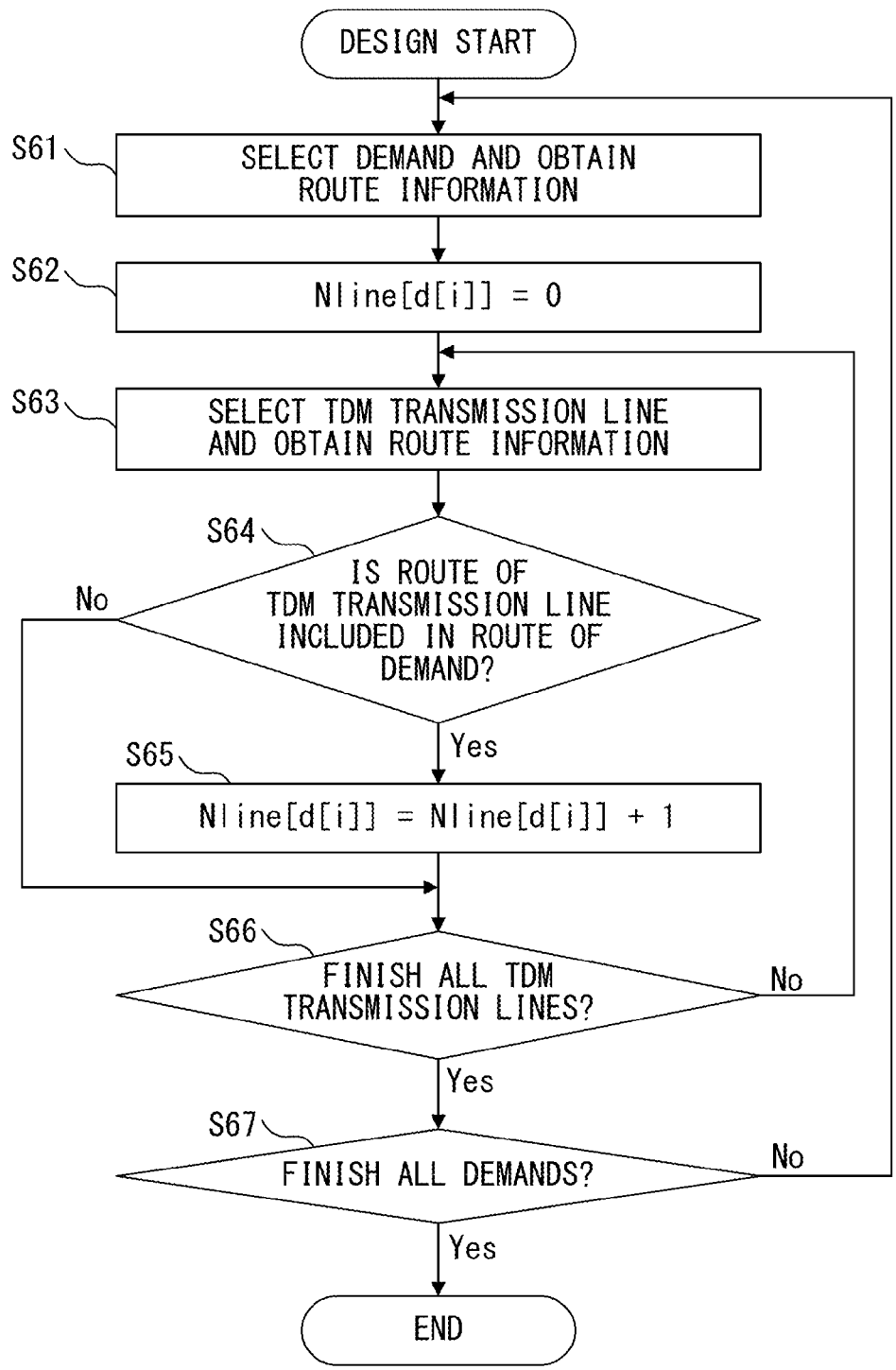
FIG. 33 is a flowchart which illustrates a process of counting the number of TDM transmission lines.

FIG. 33 is a flowchart which illustrates a process of counting the number of TDM transmission lines. This process corresponds to S43 in FIG. 32A.

The selector 15 performs the processes of S61-S66 for each of the demands. In S61, the selector 15 selects one demand and obtains route information indicating a route of the demand. In S62, the selector 15 initializes a variable Nline[d[i]] to zero. i identifies the selected demand.

In S63, the selector 15 selects one TDM transmission line and obtains route information indicating a route of the TDM transmission line. In S64, the selector 15 determines whether the route of the selected TDM transmission line is included in the route of the demand selected in S61. When the route of this TDM transmission line is included in the route of the demand, the selector 15 increments the variable Nline[d[i]] by one. When it is not included, the process of S65 is skipped.

The selector 15 performs the processes of S63-S65 for all of the TDM transmission lines. As a result, for the demand selected in S61, the number of TDM transmission lines included in the route is detected.

As described above, the first and fourth embodiments are different from each other in the process of rearranging demands. However, the other processes are substantially the same in the first and fourth embodiments.

In the fourth embodiment, demands are selected in descending order of the number of TDM transmission lines included in a route of a demand. Accordingly, when the numbers of hops in the plurality of demands are the same but the numbers of TDM transmission lines are different, the order of processing each of the demands is uniquely determined without depending on implementations.

Fifth Embodiment

In the first embodiment, in the flowchart illustrated in FIG. 13, demands are selected one at a time in descending order of the number of hops, and candidates for a combination of TDM transmission lines are generated for each of the selected demands. In a fifth embodiment, when the numbers of hops of the plurality of demands are the same as each other, demands are selected in ascending order of bandwidth. The other processes are substantially the same in the first and fifth embodiments.

FIG. 34 is a flowchart which illustrates a demand rearrangement process according to the fifth embodiment. The process of this flowchart corresponds to S21 in FIG. 13. Nhop[d] expresses the number of hops of a route of a demand. TotalBw[d] expresses a total bandwidth of a demand.

In S71-S72, the selector 15 compares the number of hops of a demand d[i] with the number of hops of a demand d[i+1]. When the number of hops of the demand d[i] is smaller than the number of hops of the demand d[i+1], in S74, the selector 15 exchanges the demand d[i] for the demand d[i+1] in the demand list.

When the number of hops of the demand d[i] is the same as that of the demand d[i+1], in S73, the selector 15 compares a total bandwidth of the demand d[i] with a total bandwidth of the demand d[i+1]. When the total bandwidth of the demand d[i] is larger than the total bandwidth of the demand d[i+1], in S74, the selector 15 exchanges the demand d[i] for the demand d[i+1] in the demand list. When the number of hops of the demand d[i] is larger than that of the demand d[i+1] or when the total bandwidth of the demand d[i] does not exceed the total bandwidth of the demand d[i+1], the demand d[i] and the demand d[i+1] are not exchanged.

As explained in the first embodiment, when BWmod of a TDM transmission line is not zero and does not exceed the reference value, the TDM transmission line is not used. In this case, a bandwidth of a demand corresponding to the TDM transmission line is subtracted from the total bandwidth of the TDM transmission line. Accordingly, in the fifth embodiment, as demands with a smaller bandwidth are selected first, the amount of decrease in the total bandwidth of each of the TDM transmission lines is reduced.

In the fifth embodiment, when the numbers of hops of routes of the plurality of demands are the same, demands with a smaller bandwidth are selected first. Accordingly, even when the numbers of hops of the routes of the plurality of demands are the same, the order of processing each of the demands is uniquely determined without depending on implementations.

Sixth Embodiment

The network design methods according to the first and sixth embodiments are different from each other in a method for generating candidates for a combination of TDM transmission lines. Namely, in the first embodiment, candidates for a combination of TDM transmission lines are generated by the procedure illustrated in the flowchart of FIG. 13, whereas in the sixth embodiment, the candidates for the combination of TDM transmission lines are generated by the procedure illustrated in the flowchart of FIG. 35. The other processes are substantially the same in the first and sixth embodiments.

Figure 35:
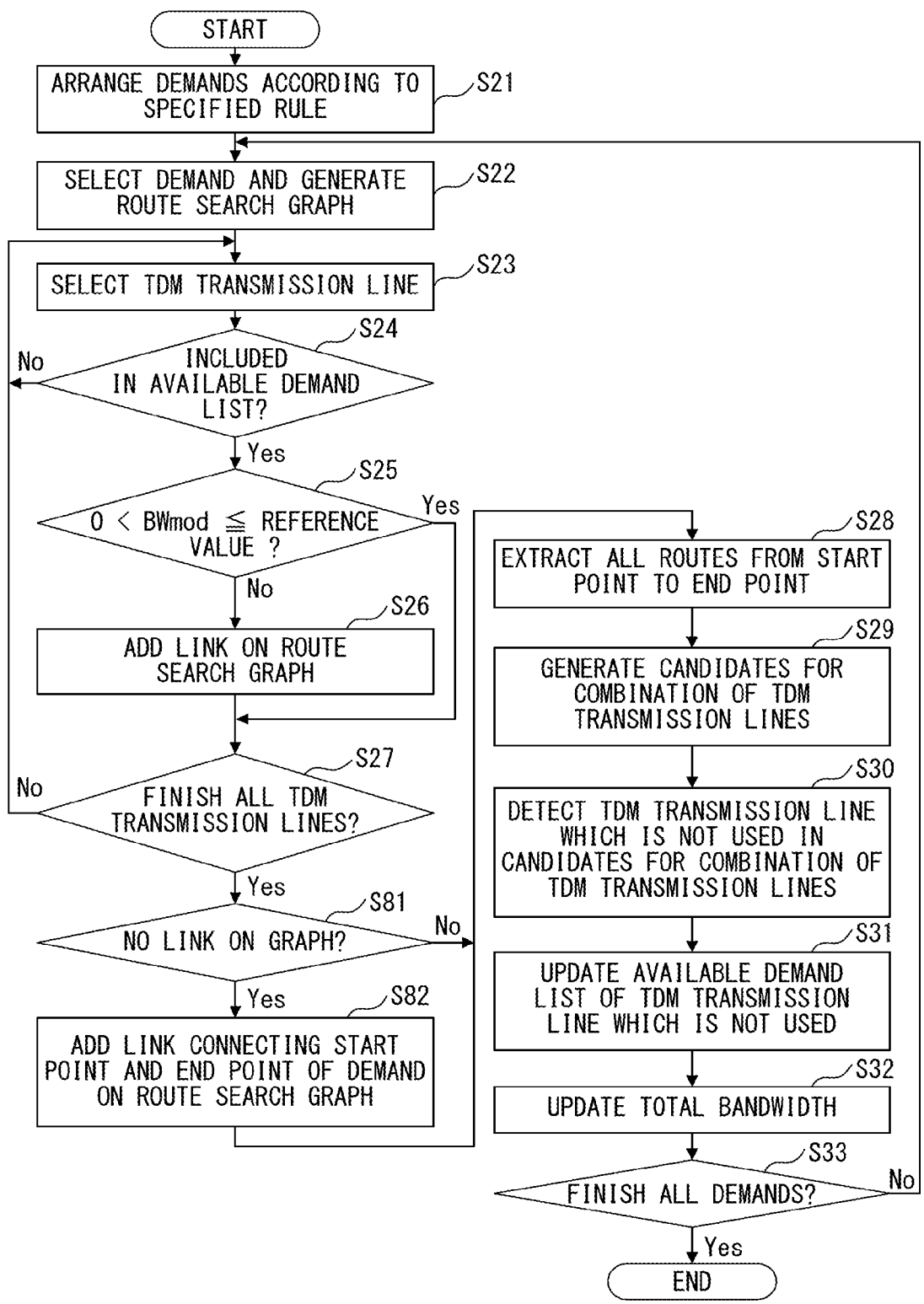
FIG. 35 is a flowchart which illustrates a process of generating candidates for a combination of TDM transmission lines in a sixth embodiment.

FIG. 35 is a flowchart which illustrates a process of generating candidates for a combination of TDM transmission lines in the sixth embodiment. S21-S27 and S28-S33 are substantially the same in the first and sixth embodiments. However, the demand rearrangement process in S21 in the sixth embodiment may be realized by any of the procedures in the first to fifth embodiments.

In the sixth embodiment, when the processes of S23-S26 is finished for all of the TDM transmission lines (S27: Yes), in S81, the combination candidate generator 16 determines whether there is a link on a route search graph with respect to a target demand. The link provided on the route search graph corresponds to a TDM transmission line with a band utilization efficiency, which is expressed as BWmod, higher than the reference value. Namely, when there are no TDM transmission lines with a band utilization efficiency higher than the reference value, there are no links on the route search graph.

When there are no links on the route search graph with respect to the target demand, the combination candidate generator 16 adds a link which directly connects a start point and an endpoint of the target demand on the route search graph. For example, when the target demand is a demand N1-N5, a link from a node N1 to a node N5 is added on the route search graph. When there is a link on the route search graph of the target demand, S82 is skipped.

When a link is not added on the route search graph in S21-S26, only one link is added on the route search graph in S82. Accordingly, in this case, a TDM transmission line corresponding to the link added in S82 is selected as a TDM transmission line which will accommodate the demand.

As described above, in the sixth embodiment, when there are no TDM transmission lines with good band utilization efficiency, a demand is accommodated in the TDM transmission line corresponding to a link from a start point to an endpoint of the demand. Accordingly, the situation in which a TDM transmission line which will accommodate a demand is not obtained is avoided with a small number of calculations.

Seventh Embodiment

The network design methods according to the first and seventh embodiments are different from each other in a method for generating candidates for a combination of TDM transmission lines. Namely, in the first embodiment, the candidates for the combination of TDM transmission lines are generated by the procedure illustrated in the flowchart of FIG. 13, whereas in the seventh embodiment, the candidates for the combination of TDM transmission lines are generated by the procedure illustrated in the flowchart of FIG. 36. The other processes are substantially the same in the first and seventh embodiments.

Figure 36:
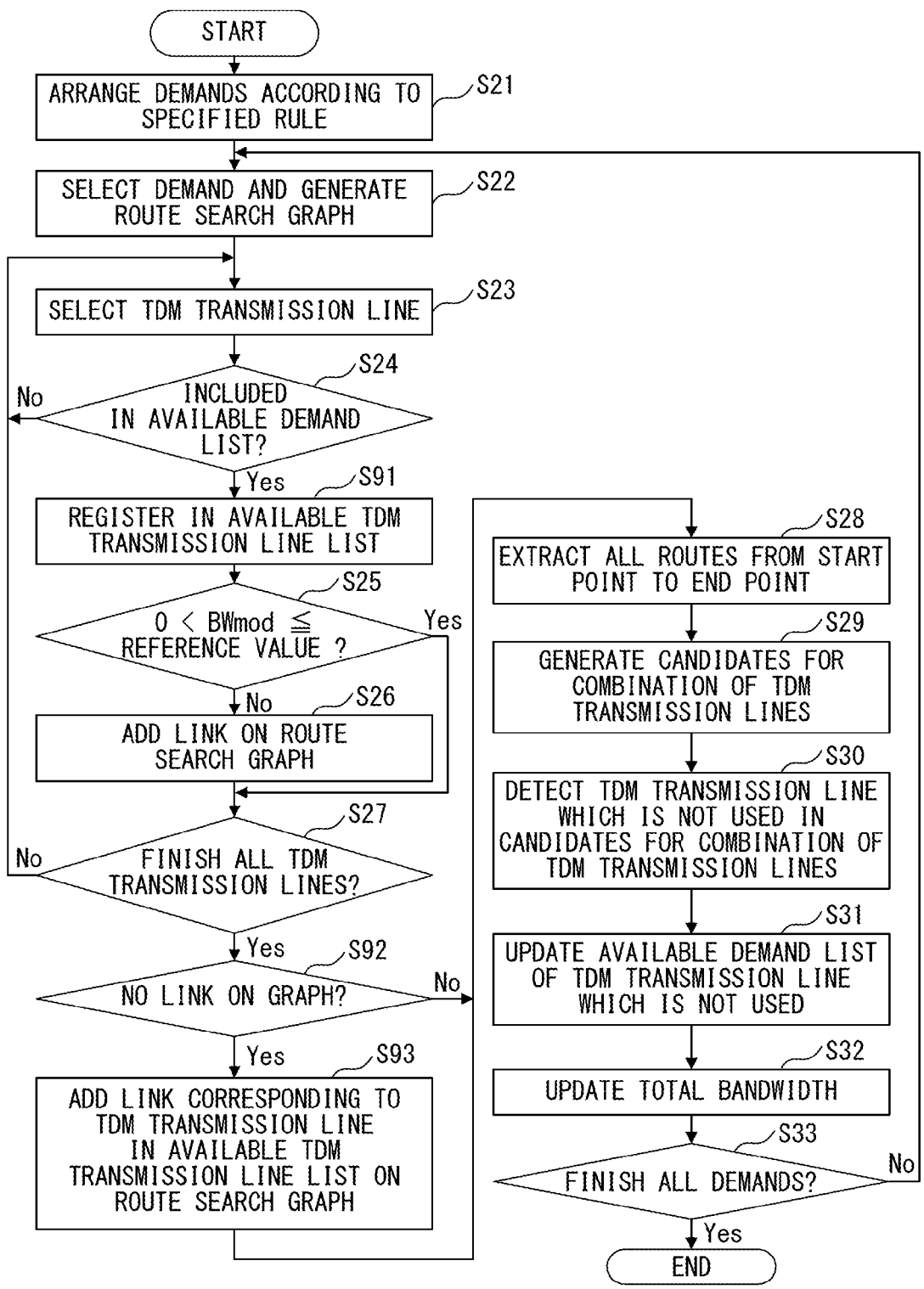
FIG. 36 is a flowchart which illustrates a process of generating candidates for a combination of TDM transmission lines in a seventh embodiment.

FIG. 36 is a flowchart which illustrates a process of generating candidates for a combination of TDM transmission lines in the seventh embodiment. S21-S24, S25-S27, and S28-S33 are substantially the same in the first and seventh embodiments. However, the demand rearrangement process of S21 in the seventh embodiment may be realized by any of the procedures in the first to fifth embodiments.

In the seventh embodiment, when a target demand is included in an available demand list of a target TDM transmission line (S24: Yes), the process of S91 is performed. In S91, the combination candidate generator 16 registers the target TDM transmission line in the available TDM transmission line list.

Assume, as an example, that a demand N1-N5 has been selected as a target demand. In this case, when the processes of S23-S26 are repeatedly performed for each of the TDM transmission lines, the available demand information illustrated in FIG. 11 is referred to. When the demand N1-N5 has been registered in an available demand list of a target TDM transmission line, the target TDM transmission line is registered in the available TDM transmission line list. Accordingly, when the processes of S23-S26 is performed for all of the TDM transmission lines, the available TDM transmission list illustrated in FIG. 37 is obtained.

In the seventh embodiment, when the processes of S23-S26 are performed for all of the TDM transmission lines (S27: Yes), in S92, the combination candidate generator 16 determines whether a link exists on a route search graph of the target demand. When the link does not exist on the route search graph of the target demand, in S93, the combination candidate generator 16 adds links corresponding to all of the TDM transmission lines registered in the available TDM transmission line list. For example, when the target demand is a demand N1-N5, links corresponding to ten TDM transmission lines illustrated in FIG. 37 are added on the route search graph. When at least one link exists on the route search graph of the target demand, S93 is skipped.

As described above, in the seventh embodiment, when there are no TDM transmission lines with good band utilization efficiency, combination candidates are generated without considering the band utilization efficiency. Accordingly, a situation in which a TDM transmission line which will accommodate a demand is not obtained is avoided.

Eighth Embodiment

The network design methods according to the first and eighth embodiments are different from each other in a method for generating candidates for a combination of TDM transmission lines. Namely, in the first embodiment, the candidates for the combination of TDM transmission lines are generated by the procedures illustrated in the flowchart of FIG. 13, whereas in the eighth embodiment, the candidates for the combination of TDM transmission lines are generated by the procedure illustrated in a flowchart of FIG. 38. The other processes are substantially the same in the first and eighth embodiments.

The eighth embodiment is similar to the sixth embodiment. However, in the sixth embodiment, as described above, when there are no links on the route search graph, a link corresponding to a target demand is added on the route search graph. On the other hand, in the eighth embodiment, when candidates for a combination of TDM transmission lines are not generated for the target demand, the candidates for the combination of TDM transmission lines are generated based on a start point node and an end point node of the target demand.

Figure 38:
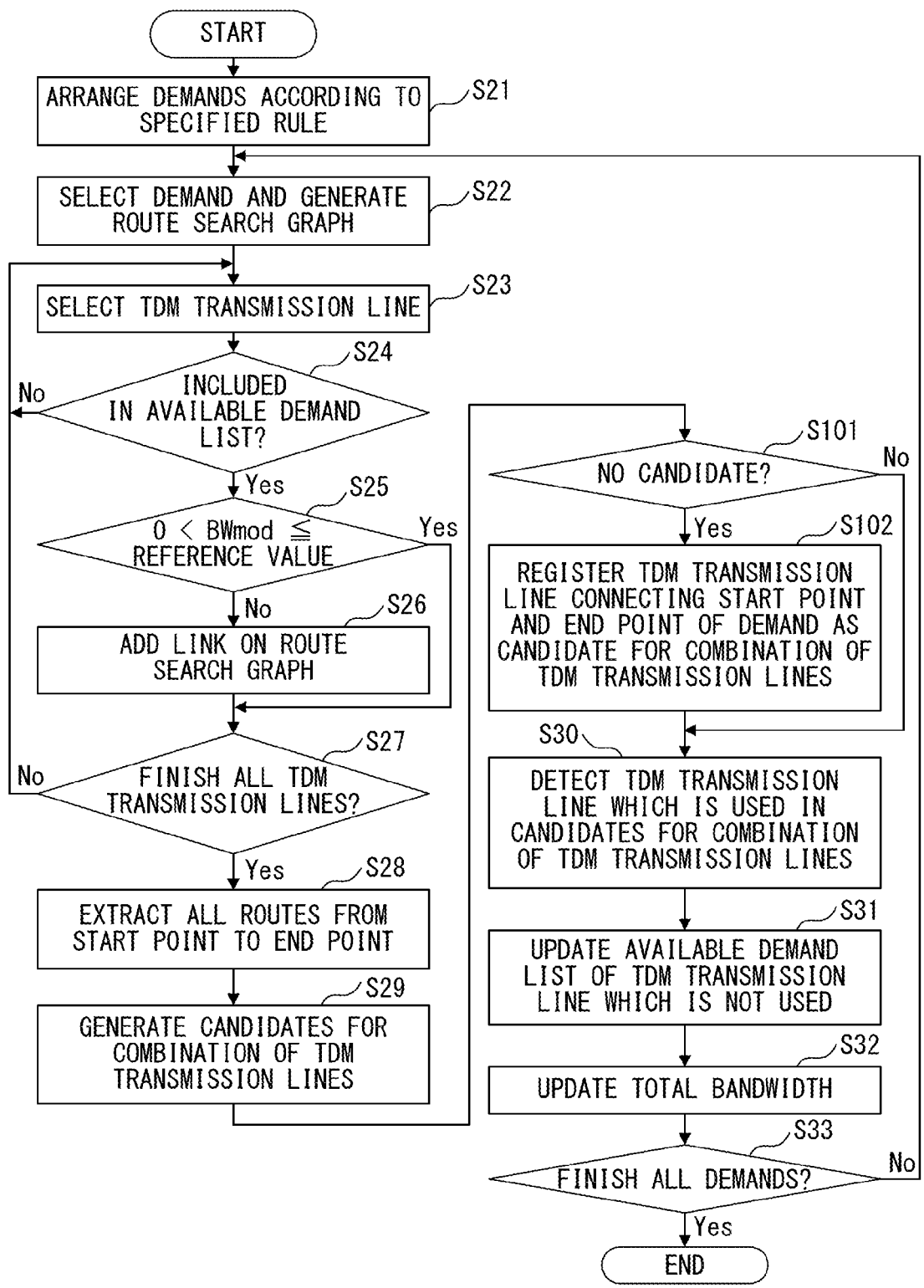
FIG. 38 is a flowchart which illustrates a process of generating candidates for a combination of TDM transmission lines in an eighth embodiment.

FIG. 38 is a flowchart which illustrates a process of generating candidates for a combination of TDM transmission lines in the eighth embodiment. S21-S29 and S30-S33 are substantially the same in the first and eighth embodiments. However, the demand rearrangement process of S21 in the eighth embodiment may be realized by any of the procedures in the first and fifth embodiments.

In the eighth embodiment, when the processes of S21-S29 are performed for a target demand, in S101, the combination candidate generator 16 determines whether candidates for a combination of TDM transmission lines are generated for the target demand. When the candidates for the combination of TDM transmission lines is not generated for the target demand, in S102, the combination candidate generator 16 prepares a TDM transmission line directly connecting a start point node and an end point node of the target demand as a candidate for a combination of TDM transmission lines. When the candidate for the combination of TDM transmission lines is generated for the target demand, S102 is skipped.

When the candidate for the combination of TDM transmission lines is not generated in S21-S29, only one candidate for the combination of TDM transmission lines is generated in S102. Accordingly, in this case, the candidate for the combination of TDM transmission lines generated in S102 is selected as a combination of TDM transmission lines which will accommodate the demand.

As described above, in the eighth embodiment, when there are no TDM transmission lines with good band utilization efficiency, a demand is accommodated in a TDM transmission line from a start point to an endpoint of the demand. Accordingly, a situation in which a TDM transmission line which will accommodate a demand is not obtained is avoided with a small number of calculations.

Ninth Embodiment

The network design methods according to the first and ninth embodiments are different from each other in a method for generating candidates for a combination of TDM transmission lines. Namely, in the first embodiment, the candidates for the combination of TDM transmission lines are generated by the procedures illustrated in the flowchart of FIG. 13, whereas in the ninth embodiment, the candidates for the combination of TDM transmission lines are generated by the procedure illustrated in a flowchart of FIG. 39. The other processes are substantially the same in the first and ninth embodiments.

The ninth embodiment is similar to the seventh embodiment. However, in the seventh embodiment, as described above, when there are no links on a route search graph, a link corresponding to a TDM transmission line registered in an available TDM transmission line list is added on the route search graph. On the other hand, in the ninth embodiment, when the candidates for the combination of TDM transmission lines are not generated for a target demand, the candidates for the combination of TDM transmission lines are generated base on TDM transmission lines registered in an available TDM transmission line list.

Figure 39:
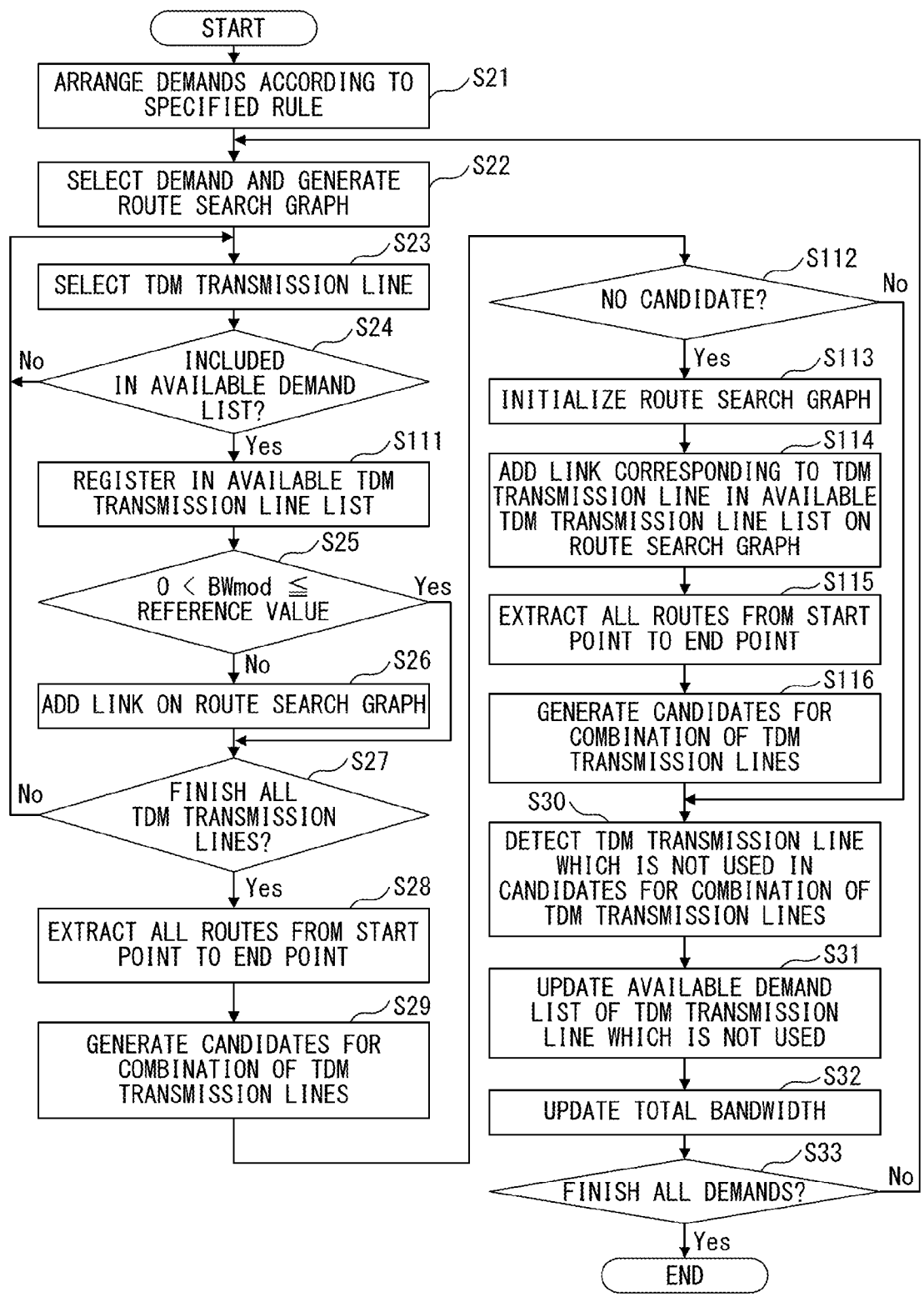
FIG. 39 is a flowchart which illustrates a process of generating candidates for a combination of TDM transmission lines in a ninth embodiment.

FIG. 39 is a flowchart which illustrates a process of generating candidates for a combination of TDM transmission lines in the ninth embodiment. S21-S24, S25-S29, and S30-S33 are substantially the same in the first and ninth embodiments. However, the demand rearrangement process of S21 in the ninth embodiment may be performed by any of the procedures in the first through fifth embodiments.

In the ninth embodiment, when a target demand is included in an available demand list of a target TDM transmission line (S24: Yes), the process of S111 is performed. The process of S111 is substantially the same as that of S91 in the seventh embodiment. Namely, the combination candidate generator 16 generates an available TDM transmission line list for a target demand.

In the ninth embodiment, when the processes of S21-S29 are performed for the target demand, in S112, the combination candidate generator 16 determines whether candidates for a combination of TDM transmission lines is generated for the target demand. When the candidates for the combination of TDM transmission lines are not generated for the target demand, in S113, the combination candidate generator 16 initializes a route search graph. When the candidates for the combination of TDM transmission lines are generated for the target demand, S113-S116 are skipped.

In S114, the combination candidate generator 16 adds links corresponding to all the TDM transmission lines registered in the available TDM transmission line list on the route search graph. The process of S114 is substantially the same as that of S93 in the seventh embodiment. S115 and S116 are substantially the same as S28 and S29. Namely, the combination candidate generator 16 extracts all routes from a start point to an end point of the route search graph corresponding to the target demand. Then, the combination candidate generator 16 generates candidates for a combination of TDM transmission lines corresponding to each of the extracted routes.

As described above, in the ninth embodiment, when there are no TDM transmission lines with good band utilization efficiency, combination candidates are generated without considering the band utilization efficiency. Accordingly, a situation in which a TDM transmission line which will accommodate a demand is not obtained is avoided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A network design method that determines a TDM (Time Division Multiplexing) transmission line for accommodating a given demand, that is represented by a start point, an end point, a bandwidth, and a route, in a network including a plurality of TDM transmission lines, the method comprising:

extracting, for respective TDM transmission lines, an available demand that is capable of using the TDM transmission line from among a plurality of given demands;
calculating a total bandwidth of the extracted available demand for respective TDM transmission lines;
sequentially selecting the plurality of demands;
generating candidates for a combination of TDM transmission lines that accommodate the selected demand; and
determining a combination of TDM transmission lines that accommodates the selected demand from among the candidates for the combination of TDM transmission lines, wherein
the process of generating the candidates for the selected demand includes:
extracting a TDM transmission line with a band utilization efficiency higher than a specified threshold from among TDM transmission lines including the selected demand as an available demand, based on the total bandwidth of the available demand for respective TDM transmission lines;
generating candidates for a combination of TDM transmission lines that accommodate the selected demand using the extracted TDM transmission line, based on the start point, the end point, and the route of the selected demand; and
updating the total bandwidth of the available demand of the TDM transmission line with a band utilization efficiency that does not exceed the threshold using a bandwidth of the selected demand, for a demand that is to be selected next.

2. The network design method according to claim 1, wherein
in the process of sequentially selecting the plurality of demands, the plurality of demands are selected in descending order of the number of nodes on a route.

3. The network design method according to claim 2, wherein
demands are selected in ascending order of the bandwidth when the numbers of nodes on the routes of the plurality of demands are the same as each other.

4. The network design method according to claim 1, wherein
in the process of sequentially selecting the plurality of demands, the plurality of demands are selected in descending order of a transmission distance of a route from a start point to an end point.

5. The network design method according to claim 1, wherein
in the process of sequentially selecting the plurality of demands, the plurality of demands are selected in descending order of the number of demand termination nodes on the route.

6. The network design method according to claim 1, wherein
in the process of sequentially selecting the plurality of demands, the plurality of demands are selected in descending order of the number of TDM transmission lines including the demand as an available demand.

7. The network design method according to claim 1, wherein
when there are no TDM transmission lines with a band utilization efficiency higher than a specified threshold for a provided demand, a TDM transmission line connecting a start point and an end point of the demand is determined to be a TDM transmission line that accommodates the demand.

8. The network design method according to claim 1, wherein
when there are no TDM transmission lines with a band utilization efficiency higher than a specified threshold for a provided demand, candidates for a combination of TDM transmission lines are generated using all of the TDM transmission lines that are available for accommodating the demand.

9. The network design method according to claim 1, wherein
when there are no candidates for a combination of TDM transmission lines that accommodates a provided demand, a TDM transmission line connecting a start point and an end point of the demand is determined to be a TDM transmission line that accommodates the demand.

10. The network design method according to claim 1, wherein
when there are no candidates for a combination of TDM transmission lines that accommodates a provided demand, the candidates for the combination of TDM transmission lines are generated using all of the TDM transmission lines that are available for accommodating the demand.

11. The network design method according to claim 1, wherein
the band utilization efficiency of a TDM transmission line is expressed by a remainder obtained by dividing a total bandwidth of an extracted available demand by the capacity of the TDM transmission line.

12. A non-transitory computer-readable recording medium having stored therein a program for causing a computer to execute a network design method that determines a TDM transmission line for accommodating a given demand, that is represented by a start point, an end point, a bandwidth, and a route, in a network including a plurality of TDM transmission lines, the method comprising: extracting, for respective TDM transmission lines, an available demand that is capable of using the TDM transmission line from among a plurality of given demands; calculating a total bandwidth of the extracted available demand for respective TDM transmission lines; sequentially selecting the plurality of demands; generating candidates for a combination of TDM transmission lines that accommodate the selected demand; and determining a combination of TDM transmission lines that accommodates the selected demand from among the candidates for the combination of TDM transmission lines, wherein the process of generating the candidates for the selected demand includes: extracting a TDM transmission line with a band utilization efficiency higher than a specified threshold from among TDM transmission lines including the selected demand as an available demand, based on the total bandwidth of the available demand for respective TDM transmission lines; generating candidates for a combination of TDM transmission lines that accommodate the selected demand using the extracted TDM transmission line, based on the start point, the end point, and the route of the selected demand; and updating the total bandwidth of the available demand of the TDM transmission line with a band utilization efficiency that does not exceed the threshold using a bandwidth of the selected demand, for a demand that is to be selected next.

13. A network design apparatus that determines a TDM transmission line for accommodating a given demand, that is expressed by a start point, an end point, a bandwidth, and a route, in a network including a plurality of TDM transmission lines, the apparatus comprising:
an available demand information generator configured to extract, for respective TDM transmission lines, an available demand that is capable of using the TDM transmission line from among a plurality of given demands, and configured to calculate a total bandwidth of the extracted available demand;
a selector configured to sequentially select the plurality of demands;
a candidate generator configured to generate candidates for a combination of TDM transmission lines that accommodate the selected demand; and
a combination determination unit configured to determine a combination of TDM transmission lines that accommodates the selected demand from among the candidates for the combination of TDM transmission lines, wherein
the candidate generator is configured to:
extract a TDM transmission line with a band utilization efficiency higher than a specified threshold from among TDM transmission lines including the selected demand as an available demand, based on the total bandwidth of the available demand for respective TDM transmission lines;
determine a candidate for a combination of TDM transmission lines that accommodate the selected demand using the extracted TDM transmission line, based on the start point, the end point, and the route of the selected demand; and
update a total bandwidth of an available demand of a TDM transmission line with a band utilization efficiency that does not exceed the threshold using a bandwidth of the selected demand, for a demand that is to be selected next.

* * * * *